United States Patent
Mikawa

(10) Patent No.: US 10,354,572 B2
(45) Date of Patent: Jul. 16, 2019

(54) IMAGE GENERATION DEVICE AND IMAGE PROJECTION APPARATUS

(71) Applicant: Akihisa Mikawa, Kanagawa (JP)

(72) Inventor: Akihisa Mikawa, Kanagawa (JP)

(73) Assignee: RICOH COMPANY, LTD., Tokyo (JP)

( * ) Notice: Subject to any disclaimer, the term of this patent is extended or adjusted under 35 U.S.C. 154(b) by 0 days.

(21) Appl. No.: 15/830,575

(22) Filed: Dec. 4, 2017

(65) Prior Publication Data

US 2018/0158387 A1 Jun. 7, 2018

(30) Foreign Application Priority Data

Dec. 6, 2016 (JP) ................. 2016-236840

(51) Int. Cl.
| | |
|---|---|
| *H04N 9/31* | (2006.01) |
| *G09G 3/00* | (2006.01) |
| *G02B 26/08* | (2006.01) |
| *G03B 21/00* | (2006.01) |

(52) U.S. Cl.
CPC .......... *G09G 3/007* (2013.01); *G02B 26/085* (2013.01); *G03B 21/008* (2013.01); *G09G 3/002* (2013.01); *H04N 9/3144* (2013.01); *H04N 9/3188* (2013.01); *G09G 2320/041* (2013.01); *G09G 2340/0407* (2013.01)

(58) Field of Classification Search
CPC .... H04N 9/3144; H04N 9/3188; G09G 3/007; G09G 3/002; G09G 2320/041; G09G 2340/0407; G02B 26/085; G03B 21/008
USPC ......................................... 348/745
See application file for complete search history.

(56) References Cited

U.S. PATENT DOCUMENTS

| 5,883,742 | A | 3/1999 | Kamata |
| 9,918,054 | B2 * | 3/2018 | Mikawa ............... G02B 26/085 |
| 2005/0050569 | A1 | 3/2005 | Yamanaka et al. |
| 2005/0193576 | A1 | 9/2005 | Hollman et al. |
| 2006/0284495 | A1 | 12/2006 | Seo |
| 2010/0033820 | A1 | 2/2010 | Omi |

(Continued)

FOREIGN PATENT DOCUMENTS

| JP | 2001-350196 | 12/2001 |
| JP | 2006-067562 | 3/2006 |

(Continued)

*Primary Examiner* — Michael Lee

(74) *Attorney, Agent, or Firm* — Harness, Dickey & Pierce, P.L.C.

(57) ABSTRACT

An image generation device includes an image generator, a stationary unit, and a diffusion heat radiator. The image generator receives light and generate an image. The stationary unit includes a stationary plate and a movable unit. The movable unit includes a movable plate and a diffusion heat radiator. The movable plate is movably supported at a plurality of support portions by the stationary plate. The image generator is mounted on the movable plate. The diffusion heat radiator is connected to the movable plate at a plurality of connection portions of the movable plate. Assuming that one of the support portions constitutes a pair with one of the connection portions closest to the one of the support portions, each of the connection portions constitutes the pair with a corresponding one of the support portions that not share the pair with any other connection portion of the connection portions.

20 Claims, 14 Drawing Sheets

(56) References Cited

U.S. PATENT DOCUMENTS

| | | |
|---|---|---|
| 2011/0019157 A1 | 1/2011 | He |
| 2014/0036239 A1 | 2/2014 | Mashitani |
| 2015/0219983 A1 | 8/2015 | Mashitani et al. |
| 2015/0264291 A1 | 9/2015 | Tani et al. |
| 2016/0154294 A1 | 6/2016 | Fujioka et al. |
| 2016/0198134 A1 | 7/2016 | Mikawa et al. |
| 2016/0277716 A1 | 9/2016 | Mikawa et al. |
| 2017/0017092 A1 | 1/2017 | Mikawa |
| 2017/0187996 A1 | 6/2017 | Yokoyama et al. |
| 2017/0244940 A1 | 8/2017 | Mikawa et al. |
| 2017/0272710 A1 | 9/2017 | Mikawa |
| 2017/0272711 A1 | 9/2017 | Mikawa |
| 2017/0272718 A1 | 9/2017 | Mikawa et al. |
| 2017/0347070 A1 | 11/2017 | Yamada et al. |

FOREIGN PATENT DOCUMENTS

| | | |
|---|---|---|
| JP | 2008-070494 | 3/2008 |
| JP | 2008-225158 | 9/2008 |
| JP | 2008-292647 | 12/2008 |
| JP | 2010-243686 | 10/2010 |
| JP | 2011-027821 | 2/2011 |
| JP | 2012-181386 | 9/2012 |
| JP | 2013-117629 | 6/2013 |
| JP | 2016-085363 | 5/2016 |
| JP | 2016-102945 | 6/2016 |
| JP | 2016-102946 | 6/2016 |
| JP | 2017-167286 | 9/2017 |
| WO | WO2016/067519 | 5/2016 |

\* cited by examiner

IMAGE GENERATION DEVICE AND IMAGE PROJECTION APPARATUS

CROSS-REFERENCE TO RELATED APPLICATION

This patent application is based on and claims priority pursuant to 35 U.S.C. § 119(a) to Japanese Patent Application No. 2016-236840, filed on Dec. 6, 2016, in the Japan Patent Office, the entire disclosure of which is hereby incorporated by reference herein.

BACKGROUND

Technical Field

Aspects of the present disclosure relate to an image generation device and an image projection apparatus.

Related Art

For example, there is known an image projection apparatus in which a display element generates a projection image based on input image data, and the generated projection image is magnified and projected on a screen or the like.

For example, an image projection apparatus is proposed that performs pixel shift by shifting the optical axis with a pixel shifter with respect to light beams emitted from a plurality of pixels of a display element, to project an image having a higher resolution than the resolution of the display element.

SUMMARY

In an aspect of the present disclosure, there is provided an image generation device that includes an image generator, a stationary unit, and a diffusion heat radiator. The image generator receives light and generate an image. The stationary unit includes a stationary plate and a movable unit. The movable unit includes a movable plate and a diffusion heat radiator. The movable plate is movably supported at a plurality of support portions by the stationary plate. The image generator is mounted on the movable plate. The diffusion heat radiator is connected to the movable plate at a plurality of connection portions of the movable plate. Assuming that one of the support portions constitutes a pair with one of the connection portions closest to the one of the support portions, each of the connection portions constitutes the pair with a corresponding one of the support portions that not share the pair with any other connection portion of the connection portions.

In another aspect of the present disclosure, there is provided an image projection apparatus that includes a light source, the image generation device, an illumination optical unit, and a projection optical unit. The image generation device receives light from the light source and generate an image. The illumination optical unit guides the light from the light source to the image generation device. The projection optical unit projects the image generated by the image generation device.

BRIEF DESCRIPTION OF THE SEVERAL VIEWS OF THE DRAWINGS

The aforementioned and other aspects, features, and advantages of the present disclosure would be better understood by reference to the following detailed description when considered in connection with the accompanying drawings, wherein.

Figure 1:
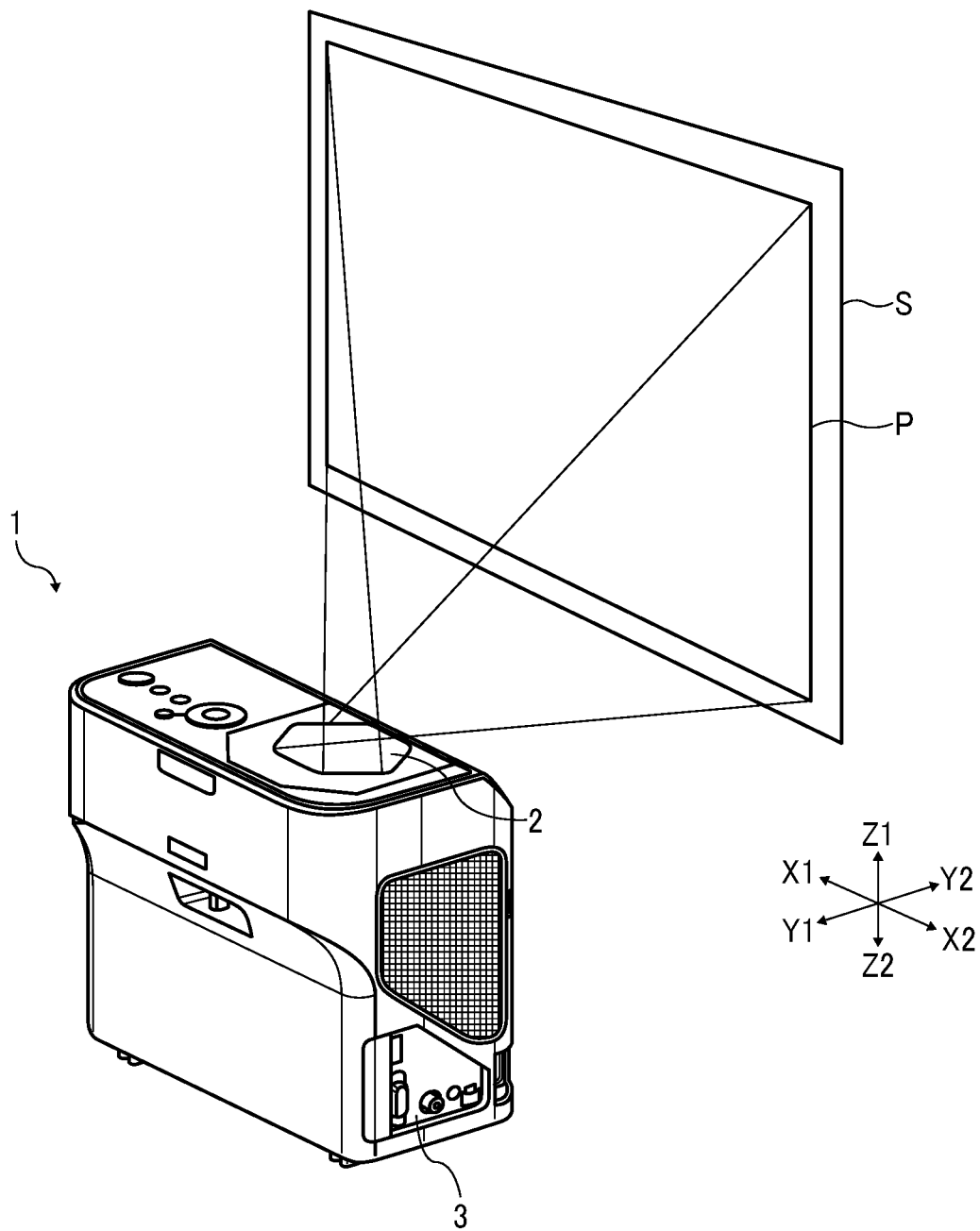
FIG. 1 is a diagram of an example of an image projection apparatus according to an embodiment of the present disclosure.

The accompanying drawings are intended to depict embodiments of the present disclosure and should not be interpreted to limit the scope thereof. The accompanying drawings are not to be considered as drawn to scale unless explicitly noted.

DETAILED DESCRIPTION

In describing embodiments illustrated in the drawings, specific terminology is employed for the sake of clarity. However, the disclosure of this patent specification is not intended to be limited to the specific terminology so selected and it is to be understood that each specific element includes all technical equivalents that operate in a similar manner and achieve similar results.

Although the embodiments are described with technical limitations with reference to the attached drawings, such description is not intended to limit the scope of the disclosure and all of the components or elements described in the embodiments of this disclosure are not necessarily indispensable.

Hereinafter, embodiments of the present disclosure are described with reference to attached drawings. Note that embodiments are not limited to the embodiments described below, but can be appropriately modified without departing from the gist of the present invention. In the following description, a side (top-plate side) of an image projection apparatus closer to a top plate is referred to as "upper" or "above", and a side (heat-sink side) of the image projection apparatus closer to a heat sink may be referred to as "lower" or "below".

<Image Projection Apparatus>

An image projection apparatus according to an embodiment of the present disclosure is described below. In the present embodiment, a case in which the image projection apparatus is a projector is described.

FIG. 1 is an illustration of an example of the image projection apparatus according to an embodiment of the present disclosure. As illustrated in FIG. 1, a projector 1 as the image projection apparatus according to the present embodiment includes an exit window 2, an external interface (external I/F) 3, and an optical engine to generate a projection image. For example, when image data is transmitted from a personal computer or a digital camera connected to the external I/IF 3, the projector 1 generates a projection image based on the image data transmitted by the optical engine and projects an image P from the exit window 2 onto a screen S.

In the following drawings, the term "X1-X2 direction" represents the width direction of the projector 1, the term "Y1-Y2 direction" represents the depth direction of the projector 1, and the terms "Z1-Z2 direction" represents the height direction of the projector 1. In the following description, in the Z1-Z2 direction, a side (exit-window side) of the projector 1 closer to the exit window 2 may be referred as "upper" and the opposite side of the exit-window side may be referred to as "lower".

Figure 2:
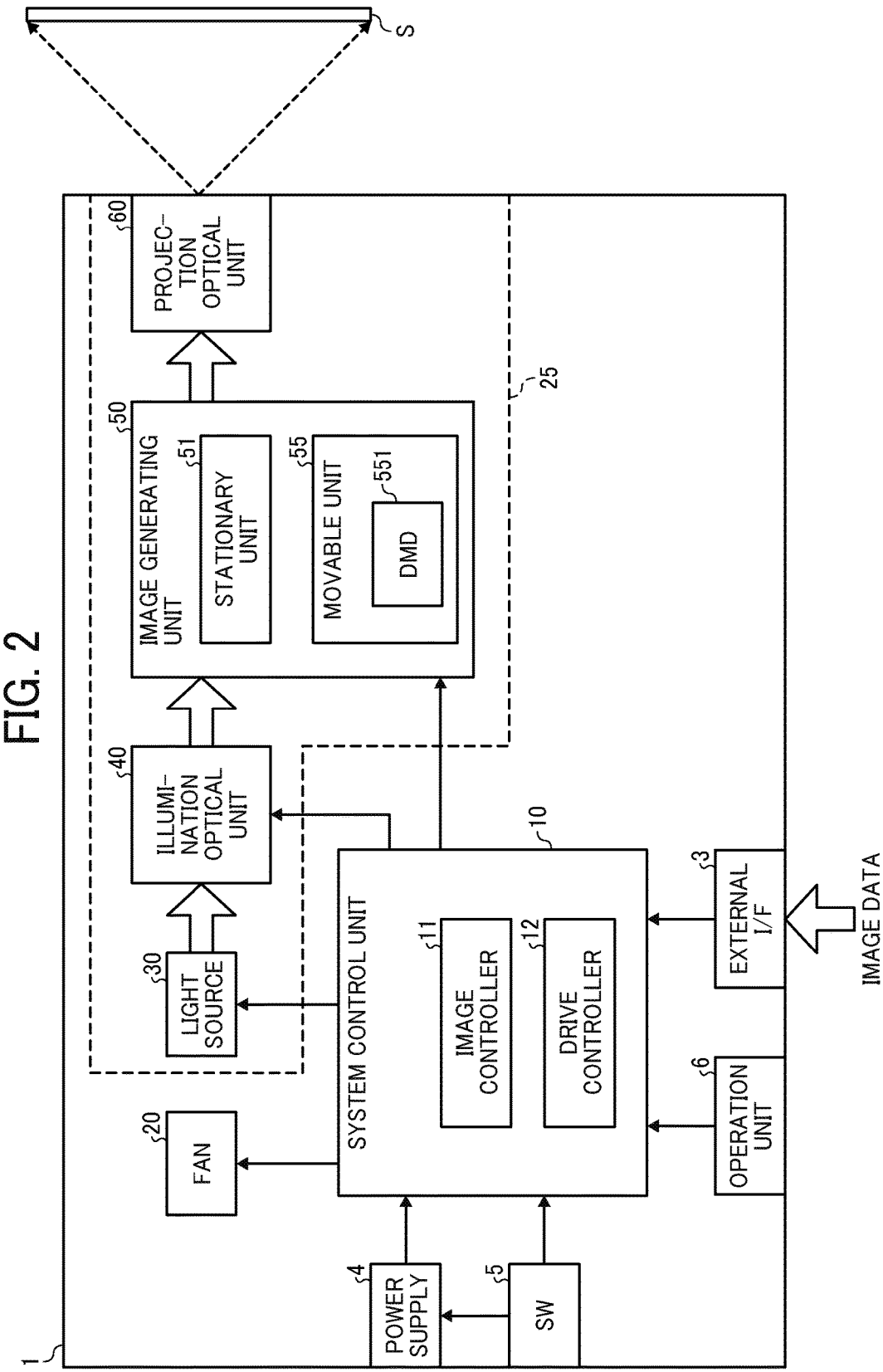
FIG. 2 is a block diagram of a configuration of a projector according to an embodiment of the present disclosure.

FIG. 2 is a block diagram of a configuration of the projector 1 according to an embodiment of the present disclosure. As illustrated in FIG. 2, the projector 1 includes the external I/F 3, a power supply 4, a main switch (SW) 5, an operation unit 6, a system control unit 10, a fan 20, and an optical engine 25.

The power supply 4 is connected to a commercial power supply, converts the voltage and frequency for an internal circuit of the projector 1, and supplies power to, e.g., the system control unit 10, the fan 20, the optical engine 25.

The main switch (SW) 5 is used for ON/OFF operation of the projector 1 by the user. When the main switch (SW) 5 is turned on while the power supply 4 is connected to the commercial power supply via, e.g., a power cord, the power supply 4 starts supplying power to parts of the projector 1. When the main switch (SW) 5 is turned off, the power supply 4 stops supplying power to parts of the projector 1.

The operation unit 6 includes, e.g., keys to accept various operations by the user, and is disposed, for example, on an upper surface of the projector 1. The operation unit 6 accepts operations by the user, such as adjustment of the size, color tone, and focus of the projection image. The user's operation accepted by the operation unit 6 is sent to the system control unit 10.

The external I/F 3 includes a connection terminal connected to, for example, a personal computer and a digital camera, and outputs image data transmitted from the connected device to the system control unit 10.

The system control unit 10 includes an image controller 11 and a drive controller 12. The system control unit 10 includes, for example, a central processing unit (CPU), a read only memory (ROM), and a random access memory (RAM). The function of each part of the system control unit 10 is realized, for example, by the CPU executing a program stored in the ROM in cooperation with the RAM.

Based on the image data input from the external OF 3, the image controller 11 controls a digital micro mirror device (DMD) 551, which is an image generator disposed in an image generation unit 50 as an image generation device of the optical engine 25, to generate an image to be projected on the screen S.

The drive controller 12 controls a drive unit to move a movable unit 55 that is movably disposed in the image generation unit 50, and controls the position of the DMD 551 disposed in the movable unit 55.

The fan 20 is rotated under the control of the system control unit 10, to cool a light source 30 that is a lamp unit of the optical engine 25.

The optical engine 25 includes the light source 30, an illumination optical unit 40 as an image display device, the image generation unit 50 as the image generation device, and a projection optical unit 60, and projects an image onto the screen S under control of the system control unit 10.

The light source 30 is, for example, a mercury high pressure lamp, a xenon lamp, or a light emitting diode (LED) and is controlled by the system control unit 10 to irradiate the illumination optical unit 40 with light.

The illumination optical unit 40 includes, for example, a color wheel, a light tunnel, and a relay lens, and guides the light emitted from the light source 30 to the DMD 551 disposed in the image generation unit 50.

The image generation unit 50 includes a stationary unit 51 that is a stationary portion securely supported, and the movable unit 55 that is a movable part movably supported by the stationary unit 51. The movable unit 55 includes the DMD 551. The position of the movable unit 55 with respect to the stationary unit 51 is controlled by the drive controller 12 of the system control unit 10. The DMD 551 is an example of the image generation unit. The DMD 551 is controlled by the image controller 11 of the system control unit 10 and modulates the light guided by the illumination optical unit 40 to generate a projection image.

The projection optical unit 60 includes, for example, a plurality of projection lenses and mirrors and enlarges an image generated by the DMD 551 of the image generation unit 50 to project the image on the screen S.

<Optical Engine>

Figure 3:
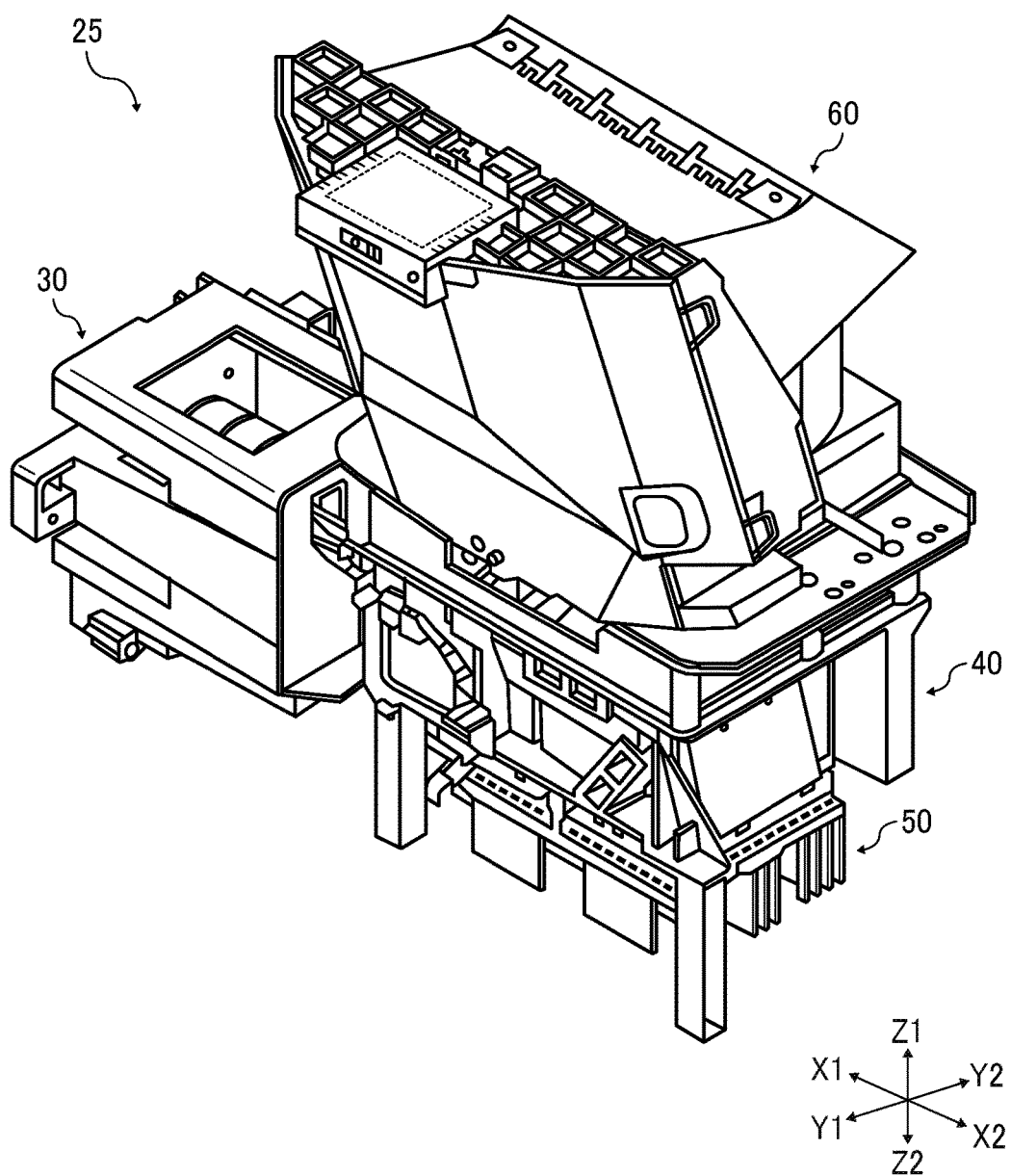
FIG. 3 is a perspective view of an optical engine according to an embodiment of the present disclosure.

Next, configurations of parts of the optical engine 25 are further described below. FIG. 3 is a perspective view of the optical engine 25 in an embodiment of the present disclosure. As illustrated in FIG. 3, the optical engine 25 is disposed inside the projector 1, and includes the light source 30, the illumination optical unit 40, the image generation unit 50, and the projection optical unit 60.

The light source 30 is disposed on a side surface of the illumination optical unit 40 and irradiates light in an X2 direction. The illumination optical unit 40 guides the light irradiated from the light source 30 to the image generation unit 50 disposed below the illumination optical unit 40. The image generation unit 50 generates a projection image using the light guided by the illumination optical unit 40. The projection optical unit 60 is disposed above the illumination optical unit 40 and projects the projection image generated by the image generation unit 50 to the outside of the projector 1.

The optical engine 25 according to the present embodiment is configured to project an image upward by using the light emitted from the light source 30. In some embodiments, the optical engine 25 may be configured to project an image in the horizontal direction.

Figure 4:
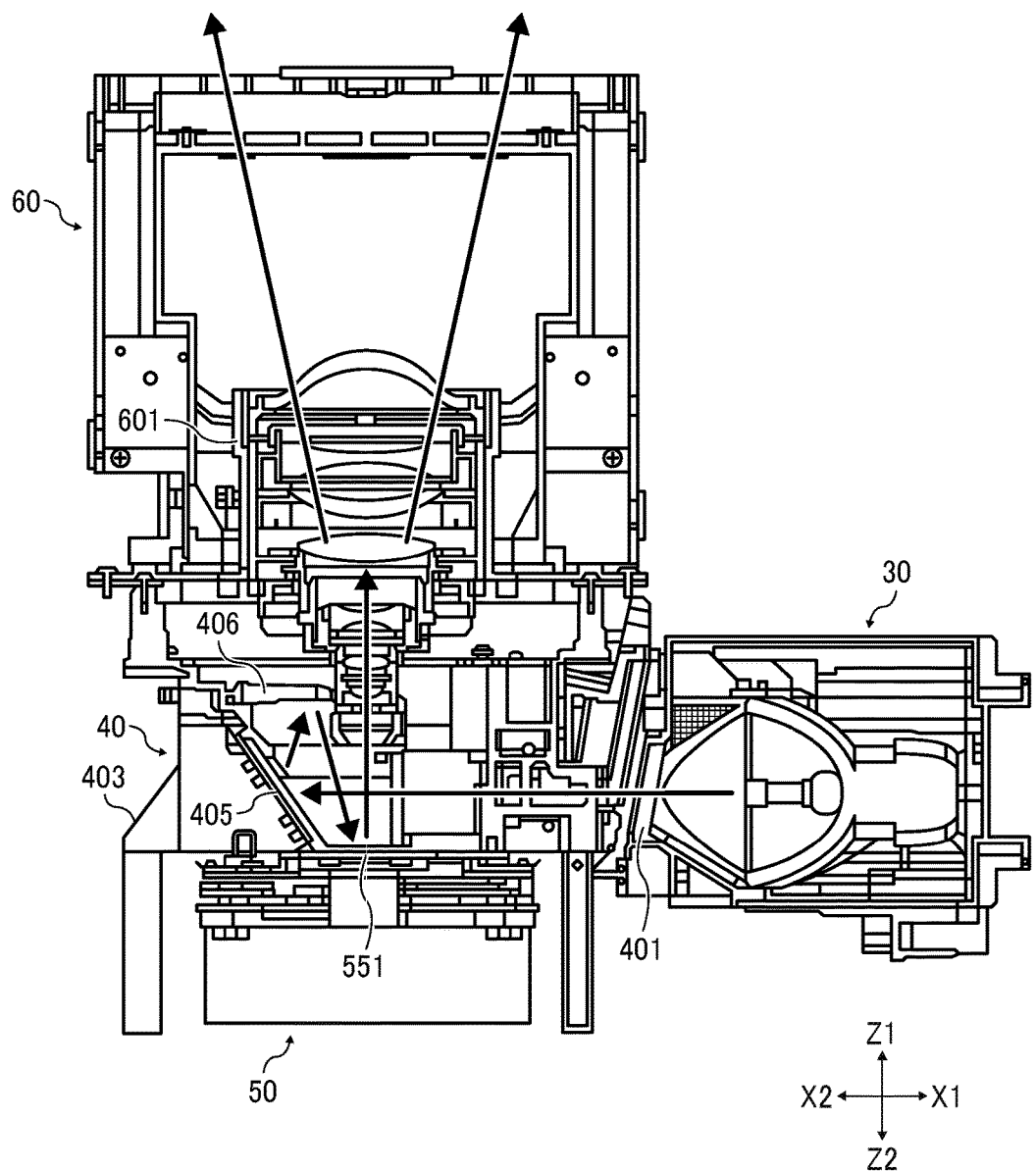
FIG. 4 is a schematic view of an internal configuration of an optical engine according to an embodiment of the present disclosure.
Figure 5:
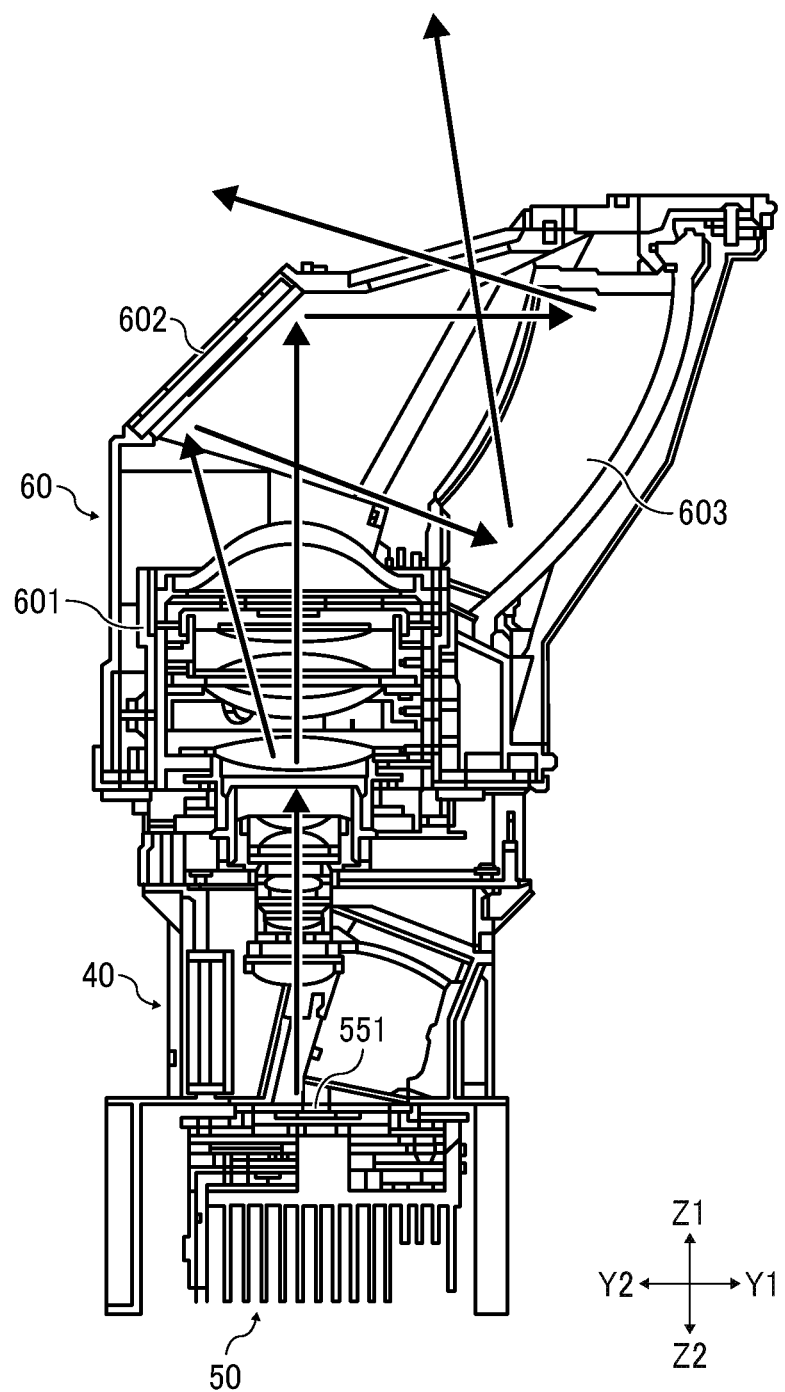
FIG. 5 is a schematic view of an internal configuration of the optical engine according to an embodiment of the present disclosure.

FIGS. 4 and 5 are schematic views of an internal configuration of the optical engine 25.

As illustrated in FIG. 4, the illumination optical unit 40 includes a color wheel 401, a plane mirror 405, and a concave mirror 406.

The color wheel 401 is, for example, a disk with filters of respective colors of, for example, R (red), G (green), and B (blue) in different portions in the circumferential direction. By rotating the color wheel 401 at high speed, the color wheel 401 time-divides the light emitted from the light source 30 into RGB colors. The plane mirror 405 and the concave mirror 406 reflect the light time-divided into RUB colors by the color wheel 401 to the DMD 551 provided in the image generation unit 50. A base 403 supports, for example, the color wheel 401, the plane mirror 405, and the concave mirror 406. The base 403 is fixed inside a housing of the projector 1.

In the illumination optical unit 40, for example, a light tunnel and a relay lens may be provided between the color wheel 401 and the plane mirror 405.

The image generation unit 50 includes the DMD 551. The DMD 551 modulates the reflected light from the concave mirror 406 to generate a projection image. The projection image generated by the DMD 551 is guided to the projection optical unit 60 through the illumination optical unit 40. A specific configuration of the image generation unit 50 is described later.

As illustrated in FIG. 5, in the projection optical unit 60, a projection lens 601, a return mirror 602, and a curved mirror 603 are provided inside a case.

The projection lens 601 includes a plurality of lenses, and focuses the projection image generated by the DMD 551 of the image generation unit 50 on the return mirror 602. The return mirror 602 and the curved mirror 603 reflect the focused projection image so as to enlarge the focused projection image, and project the focused projection image onto, e.g., the screen S outside the projector 1.

Figure 6:
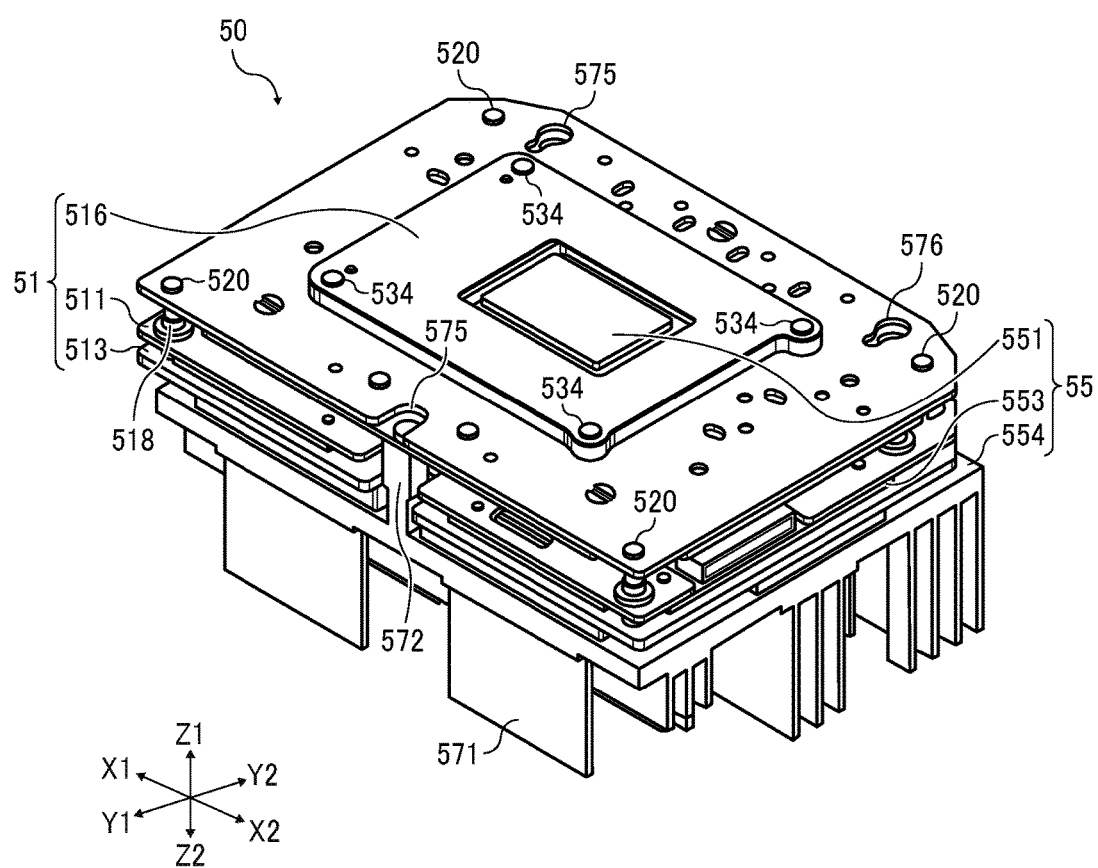
FIG. 6 is a perspective view of an image generation unit.
Figure 7:
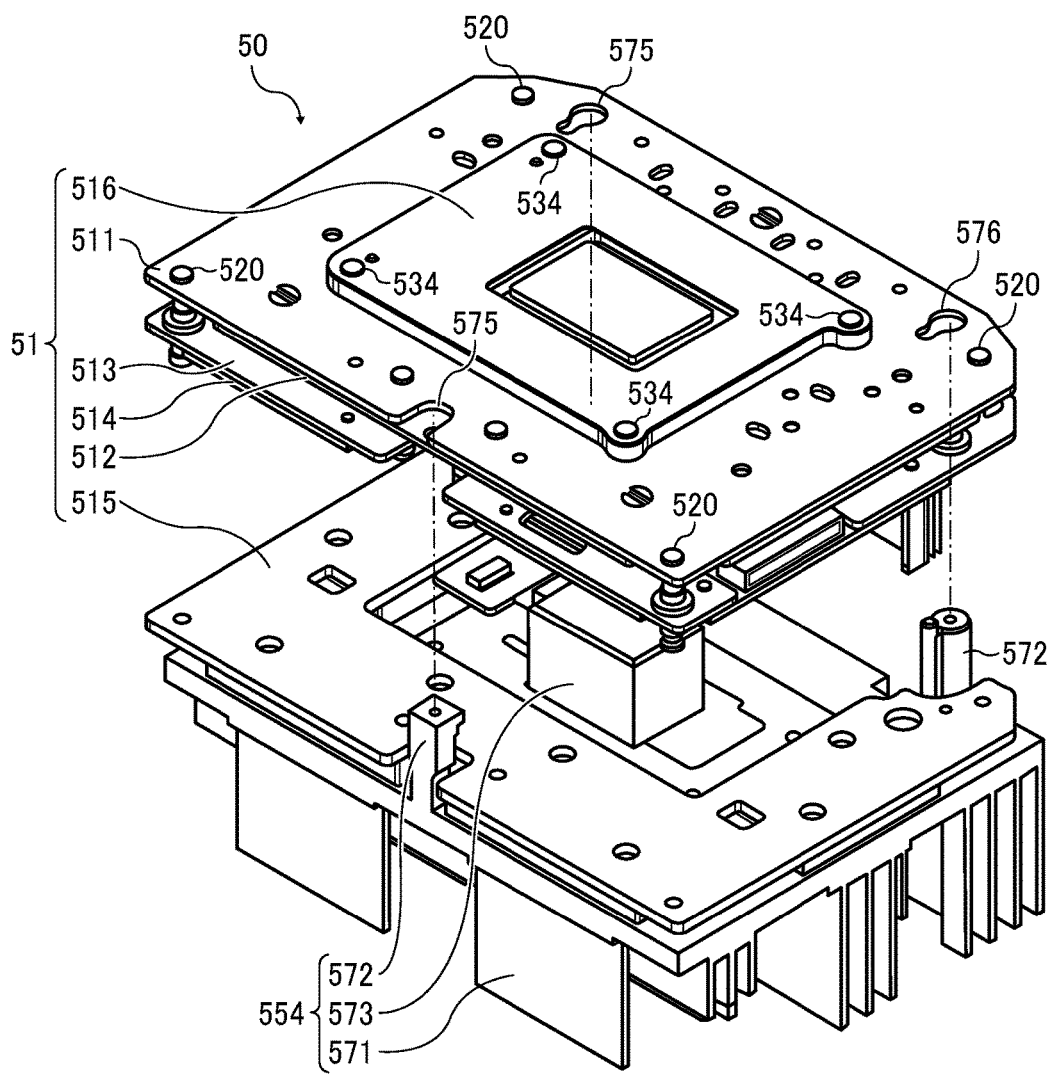
FIG. 7 is an exploded perspective view of the image generation unit of FIG. 6.
Figure 8:
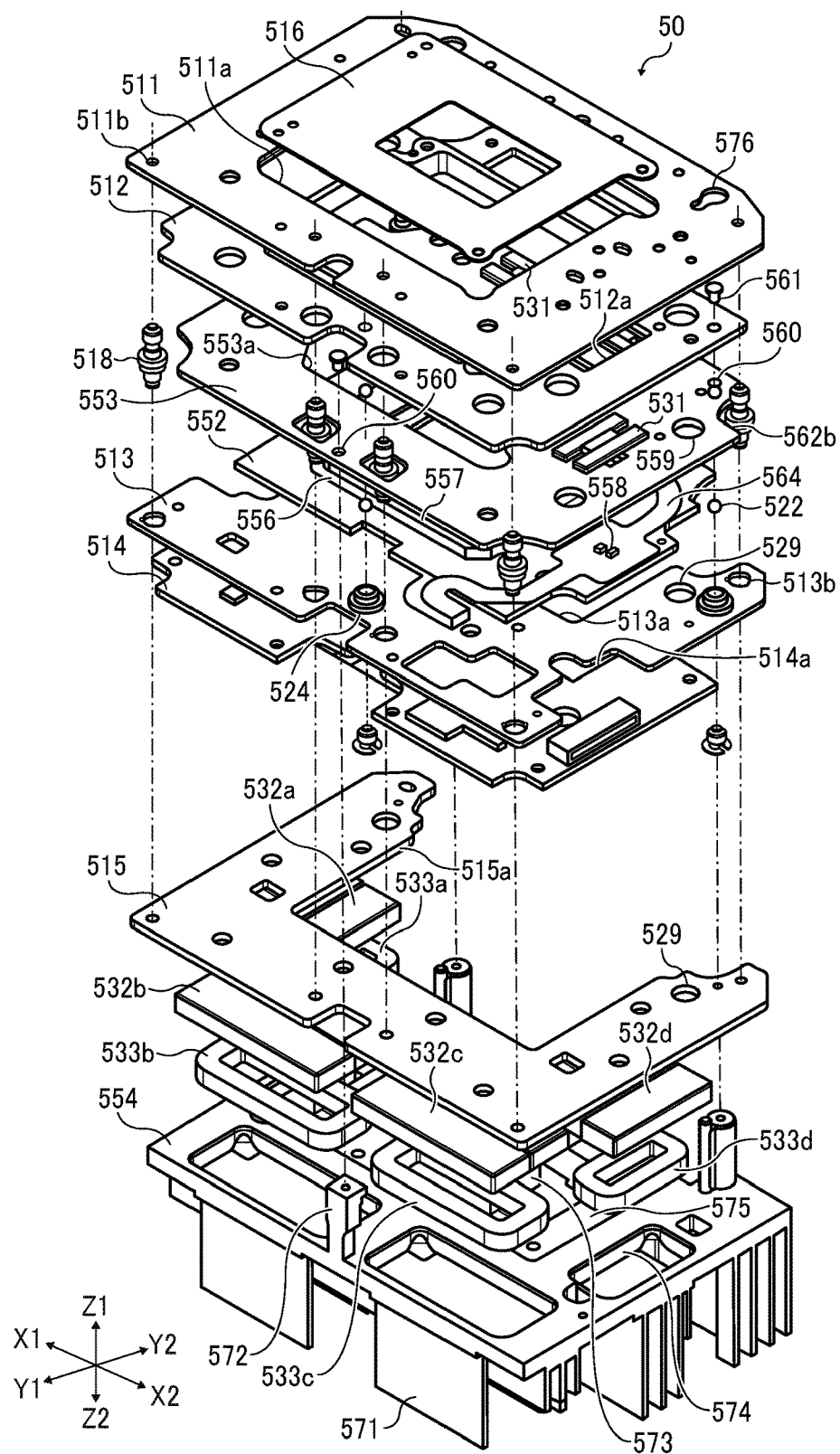
FIG. 8 is an exploded perspective view of the image generation unit of FIG. 6.

Image Generation Unit Next, the image generation unit 50 according to the present embodiment is further described. FIG. 6 is a perspective view of the image generation unit 50. FIGS. 7 and 8 are exploded perspective views of the image generation unit 50.

As illustrated in FIGS. 6 to 8, the image generation unit 50 includes the stationary unit 51 and the movable unit 55. Next, a description is given of a configuration of each of the stationary unit 51 and the movable unit 55.

Stationary Unit

The stationary unit 51 includes a top plate 511 as a second stationary plate, an intermediate plate 512, a base plate 513 as a first stationary plate, a control board 514, a sub plate 515, and a DMD mask 516 as a cover member. In the stationary unit 51, the top plate 511 is fixedly supported on a lower surface of the base 403 (see FIG. 4) of the illumination optical unit 40 (see FIG. 4).

The top plate 511, the intermediate plate 512, the base plate 513, and the sub plate 515 are flat plate members.

The top plate 511 and the intermediate plate 512 have a center hole 511a and a center hole 512a, respectively at positions corresponding to the DMD 551 of the movable unit 55. The base plate 513, the control board 514, and the sub plate 515 have a central groove 513a, a central groove 514a, and a central groove 515a, respectively, through which the heat transfer portion 573 of the heat sink 554 is inserted, at portions facing the DMD 551 provided on the DMD substrate 552.

The intermediate plate 512 is disposed on the lower surface (the surface on the base plate 513 side) of the top plate 511 and is fixed to the lower surface of the base plate 513. The intermediate plate 512 is formed so as to surround the periphery of the DMD 551, and has the center hole 512a in the portion corresponding to the DMD 551. The intermediate plate 512 disposed in the gap between the top plate 511 and the movable plate 553 reduces the gap between the top plate 511 and the movable plate 553. Such a configuration can reduce dust entering through the gap between the top plate 511 and the movable plate 553 and adhering to the DMD 551 without hampering the mobility of the movable plate 553. Thus, degradation of the quality of the projection image due to dust or other substance is suppressed. Further, since the intermediate plate 512 holds support balls 522 on a side closer to the top plate 511 (the top plate 511 side) in the through hole 521, the intermediate plate 512 functions to regulate movement positions of the support balls 522 on the side closer to the top plate 511.

The base plate 513 is disposed with a predetermined gap at a lower side (a surface on the base plate 513 side) of the intermediate plate 512 and is fixed by a plurality of supports 518.

The control board 514 is disposed on the lower surface (the surface on the heat sink 554 side) of the base plate 513 and is fixed by screws. The control board 514 receives the position information output from the Hall elements 558 via a position detection flexible printed circuit board (position detecting FPC) 564 disposed on the upper surface of the DMD substrate 552. According to the received position information, the control board 514 controls the amount of current to be passed through the driving coils 533a, 533b, 533c, and 533d (hereinafter, may be simply referred to as "driving coil 533") via a driving flexible printed board (driving FPC) 575 disposed on the upper surface (the surface on the top plate 511 side) of the heat sink 554, to control the movable unit 55.

The sub plate 515 is disposed on the lower surface of the base plate 513 via the control board 514 with a predetermined gap.

The DMD mask 516 is disposed on the upper surface of the top plate 511 around the center hole 511a and fixed to the top plate 511 by screws 534.

The top plate 511, the base plate 513, and the sub plate 515 are disposed in parallel to each other via predetermined gaps by the plurality of supports 518. An upper end portion of the support 518 is press-fitted into a support hole 511b of the top plate 511, and a lower end portion of the support 518, at which an external thread is formed, is inserted into a support hole 513b of the base plate 513. Then, the support 518 is fixed in support holes 515b of the sub plate 515 by screws 520. The support 518 forms a certain gap between any two of the top plate 511, the base plate 513, and the sub plate 515 and supports the top plate 511, the base plate 513, the sub plate 515 in parallel. Accordingly, the top plate 511 is disposed in parallel with the base plate 513 via a predetermined gap.

From the viewpoint of the driving performance of the image generation unit 50, the position detecting magnets 531 and the driving magnets 532a, 532b, 532c, and 532d (hereinafter may be simply referred to as "driving magnets 532") are arranged on the stationary unit 51 side since the position detecting magnets 531 and the driving magnets 532 are heavy. However, from the viewpoint of the magnetic circuit, the members on which the position detecting magnets 531 and the driving magnets 532 are disposed are preferably magnetic bodies. Accordingly, each of the top plate 511 and the sub plate 515, on which the position detecting magnets 531 and the driving magnets 532 are disposed, is formed of a magnetic material, such as iron or ferritic stainless steel.

In addition, the intermediate plate 512 and the base plate 513 may be made of any of a magnetic material and a non-magnetic material. In the present embodiment, the base plate 513 is also preferably made of a magnetic material, such as iron or ferritic stainless steel, for example, so that a magnetic flux from the driving magnets 532 does not leak from the sub plate 515 and adversely affect the Hall elements 558. Since the base plate 513 is made of a magnetic material, the magnetic fields generated by the position detecting magnets 531 can be separated by the base plate 513 from the magnetic fields generated by the driving magnets 532.

The top plate 511 and the base plate 513 support the movable plate 553 between the top plate 511 and the base plate 513 at three supporting positions so as to be movable in a direction parallel to the plane of the movable plate 553. The support structure of the movable plate 553 is further described.

Figure 9:
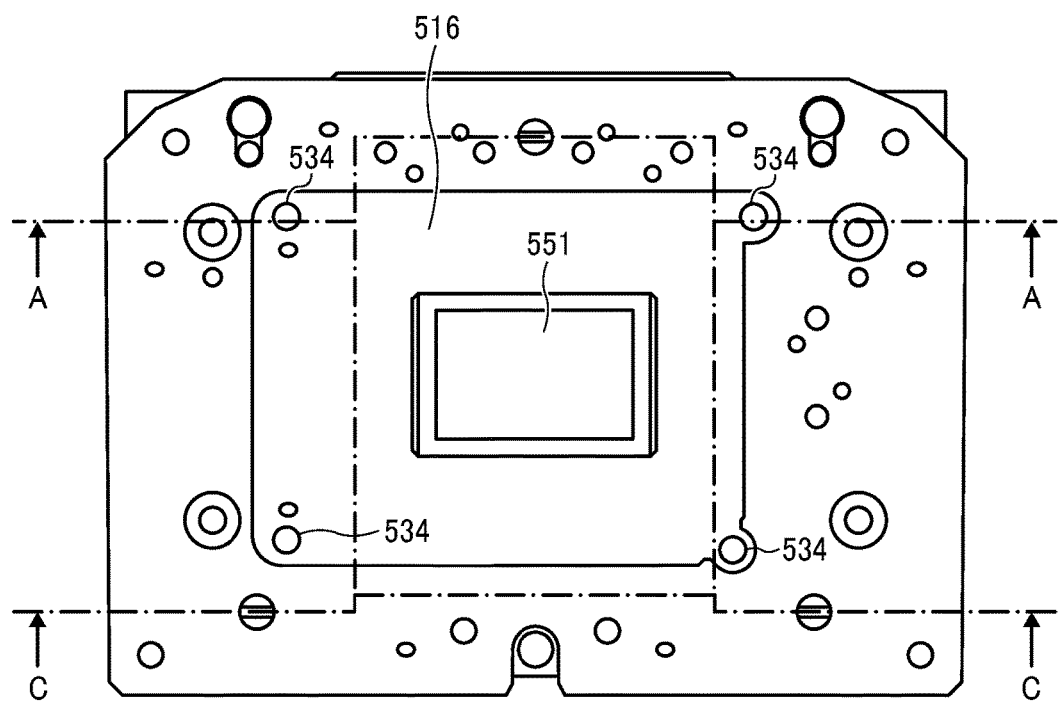
FIG. 9 is a plan view of the image generation unit viewed from a top plate side.
Figure 9:
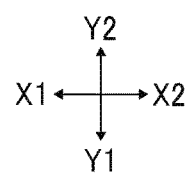
Figure 10:
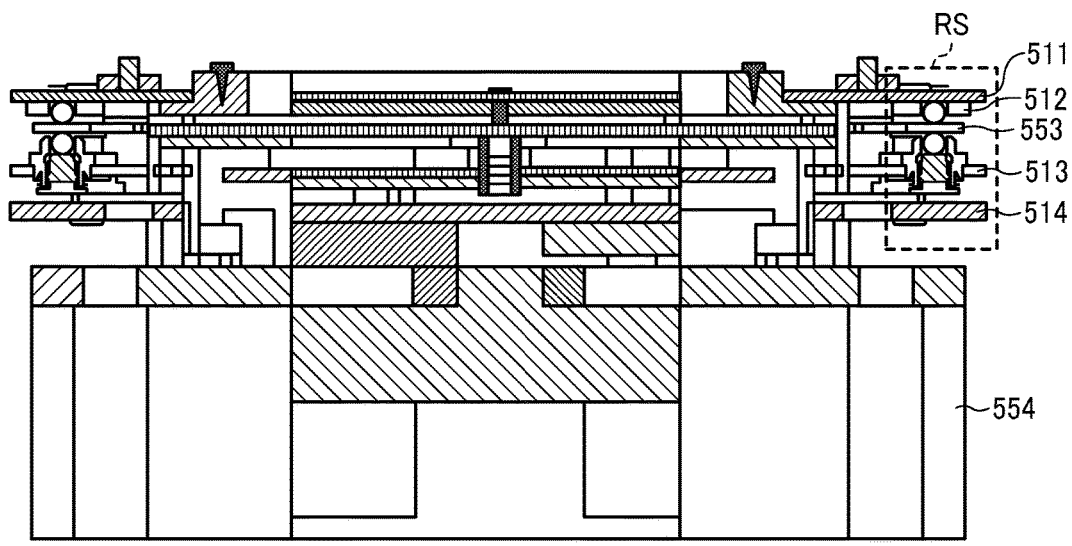
FIG. 10 is a cross-sectional view of the image generation unit cut along line A-A in FIG. 9.
Figure 10:
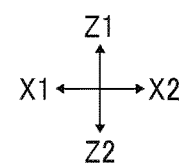
Figure 11:
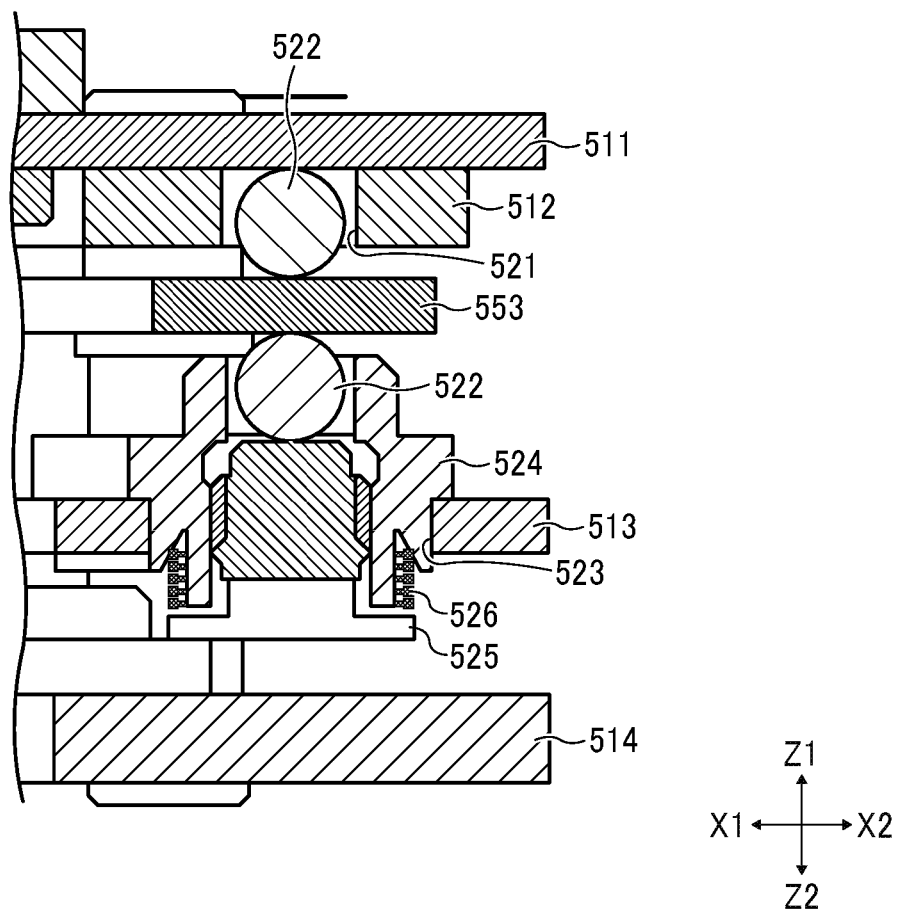
FIG. 11 is a partially enlarged view of a region indicated by RS of FIG. 10.

FIG. 9 is a plan view of the image generation unit 50 viewed from the top plate 511 side. FIG. 10 is a cross-sectional view of the image generation unit 50 cut along line A-A in FIG. 9. FIG. 11 is a partially enlarged view of a region indicated by RS of FIG. 10. As illustrated in FIGS. 9 to 11, the intermediate plate 512 has three through holes 521 that pass through the intermediate plate 512 in the vertical direction. A recess is formed by the lower surface of the top plate 511 and the through hole 521 of the intermediate plate 512. The support ball 522 is inserted into the through hole 521, and the through hole 521 rotatably holds the support ball 522.

The base plate 513 has three supporting holes 523 through the base plate 513 in the vertical direction. The three support holes 523 are disposed in the base plate 513 so as to correspond to the three through holes 521, respectively, of the top plate 511. In the support hole 523 of the base plate 513, a cylindrical holding member 524 having a female thread on the lower inner circumferential surface thereof is inserted from the top plate 511 side and is seated on the base plate 513. A position adjustment screw 525 has a male thread on an outer periphery thereof. The position adjustment screw 525 is inserted into the holding member 524 via a spring 526 from a side opposite to the top plate 511, and screwed at a lower end of the holding member 524. As a result, the support ball 522 is rotatably held in a space formed by the holding member 524 and the position adjustment screw 525.

Each support ball is rotatably held by the top plate 511 and the holding member 524 of the base plate 513, and at least a portion of the support ball 522 projects beyond the through hole 521 and the holding member 524. Accordingly, each support ball 522 contacts the movable plate 553 disposed between the top plate 511 and the base plate 513.

The three through holes 521 of the top plate 511 and the three holding members 524 of the base plate 513 are disposed so that three pairs of support balls 522 are disposed between the top plate 511 and the base plate 513. Accordingly, the three pairs of support balls 522 pinch and support the movable plate 553 between the top plate 511 and the base plate 513 at three positions of the movable plate 553. The movable plate 553 is supported from both sides of the movable plate 553 by the support balls 522 so as to be movable in a direction parallel to the top plate 511 and the base plate 513 and parallel to the surface of the movable plate 553. The support balls 522 also pinch the movable plate 553 in a state of point contact with the movable plate 553 from both sides of the movable plate 553. Such a configuration can reduce friction of the movable plate 553 with the support balls 522 when the movable plate 553 moves.

The amount of projection of the support ball 522, which is disposed in the holding member 524, from an upper end of the holding member 524 varies as the position of the position adjustment screw 525 displaces in the Z1 direction or the Z2 direction. Accordingly, the distance between the base plate 513 and the movable plate 553 can be appropriately adjusted by changing the amount of projection of the support 522 using the position adjustment screw 525.

Note that the number and positions of the supports 518 disposed in the stationary unit 51 are not limited to the configuration exemplified in the present embodiment.

Further, the base plate 513 includes through holes 529 through which screws to fix the top plate 511 to the illumination optical unit 40 (see FIGS. 2 to 5) are inserted.

Other configurations of the stationary unit 51 are described with reference to FIGS. 6 to 8.

As illustrated in FIGS. 6 to 8, the position detecting magnets 531 are disposed on the upper surface (the surface on the top plate 511 side) of the movable plate 553. Each of the position detecting magnets 531 is made of a rectangular parallelepiped permanent magnet and forms a magnetic field extending to the DMD substrate 552 disposed between the top plate 511 and the base plate 513.

The driving magnets 532 are disposed the lower surface (the surface on the side of the heat sink 554) of the sub plate 515.

The driving magnets 532 are disposed at four positions so as to surround the central groove 513a of the base plate 513 and the central groove 515a of the sub plate 515. Each of the driving magnets 532 is disposed so as to face the driving coils 533 disposed on the upper surface of the heat sink 554. The driving magnets 532 are two pairs of two rectangular parallelepiped magnets arranged so that the longitudinal directions of the two rectangular parallelepiped magnets are parallel to each other. Each of the driving magnets 532 forms a magnetic field extending to the heat sink 554. The driving magnets 532 and the driving coils 533 constitute a driver to move the movable plate 553.

Movable Unit

As illustrated in FIGS. 6 to 8, the movable unit 55 includes the DMD 551, the DMD substrate 552 as a first movable plate, the movable plate 553 as a second movable plate, and the heat sink 554 as a diffusion heat radiator. The movable unit 55 is movably supported by the stationary unit 51.

The DMD 551 is disposed on the upper surface (the surface opposite to the top plate 511) of the DMD substrate 552. The DMD 551 is exposed to the upper surface side of the movable plate 553 through the center hole 511a of the top plate 511. The DMD 551 is connected to the DMD substrate 552 via a socket 556. The outer periphery of the DMD 551 is covered by a cover 557. The DMD 551 has an image generation surface in which a plurality of movable micromirrors are arranged in a lattice pattern. Each micromirror of the DMD 551 is disposed so that a mirror surface can tilt around a torsion axis. The driving of each micromirror of the MAD 551 is turned ON/OFF based on an image signal transmitted from the image controller 11 (see FIG. 1) of the system control unit 10 (see FIG. 1).

For example, when the micromirror is "ON", the inclination angle of the micromirror is controlled so as to reflect the light from the light source 30 (see FIGS. 2 to 4) to the projection optical unit 60 (see FIGS. 2 to 4). On the other hand, for example, when the micromirror is "OFF", the inclination angle of the micromirror is controlled in such a direction as to reflect the light from the light source 30 (see FIGS. 2 to 4) toward a OFF light plate.

As described above, the DMD 551 controls the inclination angle of each micromirror according to the image signal transmitted from the image controller 11 (see FIG. 2). The light irradiated from the light source 30 (see FIGS. 2 to 4) and passing through the illumination optical unit 40 (see FIGS. 2 to 4) is modulated to generate a projection image.

The DMD substrate 552 is disposed between the top plate 511 and the base plate 513 of the stationary unit 51, and is connected to the lower surface of the movable plate 553. The DMD substrate 552 displaces together with the movable plate 553.

The DMD 551 is disposed on the upper surface of the DMD substrate 552. The DMD 551 is connected to the DMD substrate 552 via the socket 556. The outer periphery of the DMD 551 is covered by the cover 557.

In the DMD substrate 552, cutouts are formed on the periphery of the DMD substrate 552 so as not to contact the connection posts 572 of the heat sink 554 so that the movable plate 553 is fixed by the connection posts 572 of the heat sink 554.

For example, when the movable plate 553 and the DMD substrate 552 are jointly fastened to the heat sink 554 by the connection post 572, the DMD substrate 552 might deform, thus causing the image generation surface of the DMD 551 to be inclined with respect to the movement direction and distort an image. Hence, the cutouts are formed in the peripheral of the DMD substrate 552 so that the connection posts 572 of the heat sink 554 are connected to the movable plate 553 while avoiding the DMD substrate 552. Accordingly, the heat sink 554 is connected to the movable plate 553, thus reducing the possibility of occurrence of deformation due to receiving the load from the heat sink 554 on the DMD substrate 552. Therefore, the image generation surface of the DMD 551 is kept to be parallel to the movement direction, thus allowing the image quality to be maintained.

The cutouts of the DMD substrate 552 are formed so as not to contact the holding member 524 of the base plate 513 so that the support balls 522 held by the base plate 513 contact the movable plate 553 while avoiding the DMD substrate 552. Thus, contacting of the DMD substrate 552 with the support balls 522 can suppress the occurrence of, e.g., deformation in the DMD substrate 552. Accordingly, the image generation surface of the DMD 551 can be kept to be parallel to the movement direction, thus maintaining the image quality.

Note that, instead of the cutouts, for example, through holes may be formed in the DMD substrate 552 as long as the through holes are shaped so as to prevent the DMD substrate 552 from contacting the connection posts 572 of the heat sink 554 and the support balls 522.

In addition, the position detecting FPC 564 is disposed on the upper surface (the surface on the top plate 511 side) of the DMD substrate 552. On the upper surface of the position detecting FPC 564, the Hall elements 558 as magnetic sensors are disposed at positions opposed to the position detection magnets 531 disposed on the upper surface of the movable plate 553. The Hall elements 558 and the position detection magnets 531 disposed on the base plate 513 constitute a detector to detect the position of the DMD 551.

Note that, in the image generation unit 50 according to the present embodiment, from the viewpoint of driving performance, components with small weight are arranged in the movable unit 55 and components with large weight are arranged in the stationary unit 51. Accordingly, the position detecting magnets 531 and the driving magnets 532 may be included in the stationary unit 51. In addition to the Hall elements 558 and the driving coils 533, the position detecting FPC 564 and the driving FPC 575 electrically connected to the Hall elements 558 and the driving coils 533 may also be included in the movable unit 55.

Since each of the position detecting FPC 564 and the driving FPC 575 is connected to the control board 514 via a connector, one end of each of the position detecting FPC 564 and the driving FPC 575 is moved in parallel in the plane or rotated by the movable unit 55 and the other end is secured to the stationary unit 51. Accordingly, the position detecting FPC 564 and the driving FPC 575 need to have a function of absorbing the movement amount of the stationary unit 51 without hampering the movement of the stationary unit 51.

Therefore, a plurality of creases are formed in each of the position detecting FPC 564 and the driving FPC 575 so that creased portions of each of the position detecting FPC 564 and the driving FPC 575 absorb the movement amount of the stationary unit 51 even when one side of each FPC moves with the other end of each FPC fixed.

The movable plate 553 is disposed between the top plate 511 and the base plate 513 of the stationary unit 51 and is supported by the three pairs of support balls 522 so as to be movable in the direction parallel to the surface of the movable plate 553 as described above.

The movable plate 553 is formed of a flat plate member, and a center hole 553a is formed at a position corresponding to the DMD 551 disposed on the DMD substrate 552. Through holes 559, through which screws to fix the top plate 511 to the illumination optical unit 40 are inserted, are formed in the movable plate 553.

The movable plate 553 is connected and fixed with an adhesive in a state in which the interval between the movable plate 553 and the DMD 551 are adjusted with screws inserted into the connection holes so that the surface of the movable plate 553 and the image generation surface of the DMD 551 are parallel to each other.

The movable plate 553 has connection holes 560 at positions corresponding to the connection posts 572 of the heat sink 554. The movable plate 553 is fixed to the upper ends of the connection posts 572 together with the DMD substrate 552 by screws 561 inserted into the connection holes 560.

Next, the arrangement relationship between the support portion of the movable plate 553 supported by the top plate 511 and the base plate 513 and the connection portion of the movable plate 553 connected to the heat sink 554 is described below.

Figure 12:
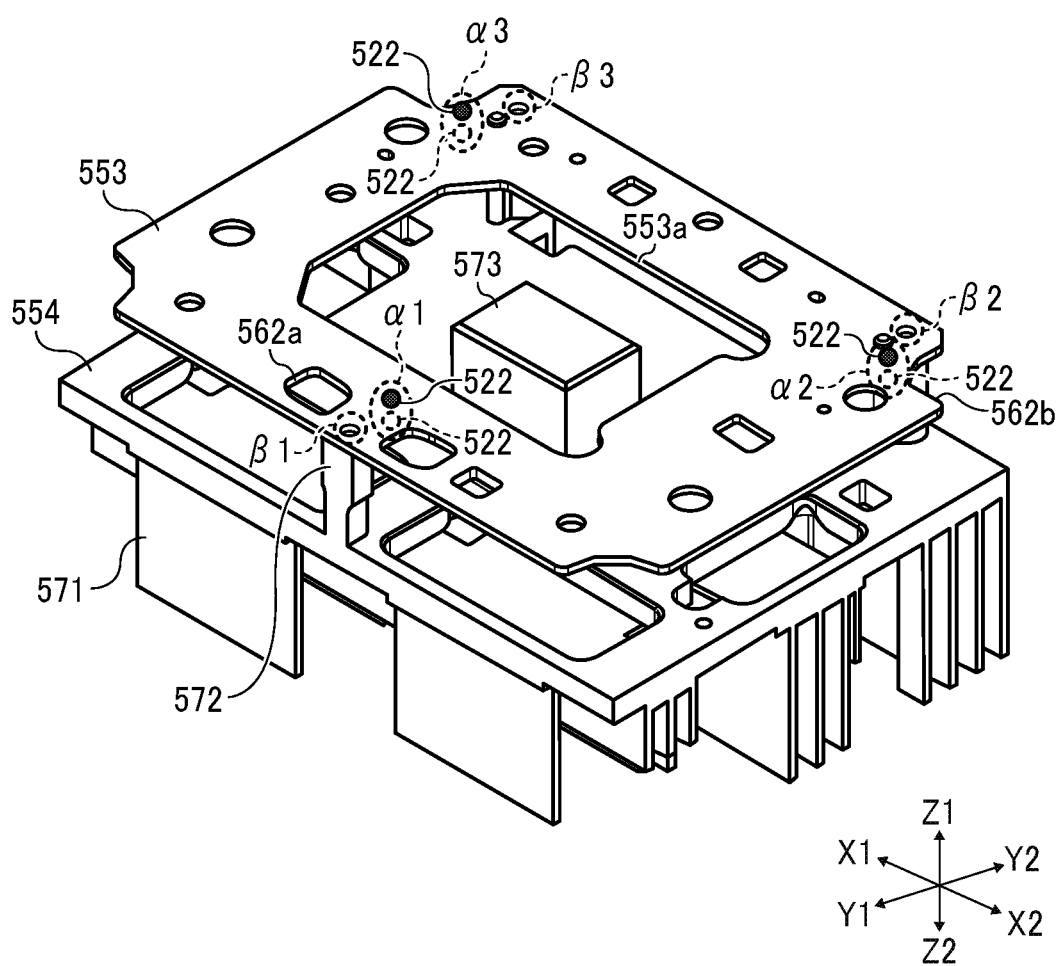
FIG. 12 is an illustration of an arrangement relationship between supporting portions of a movable plate and connecting portions of the movable plate connected to a heat sink.
Figure 13:
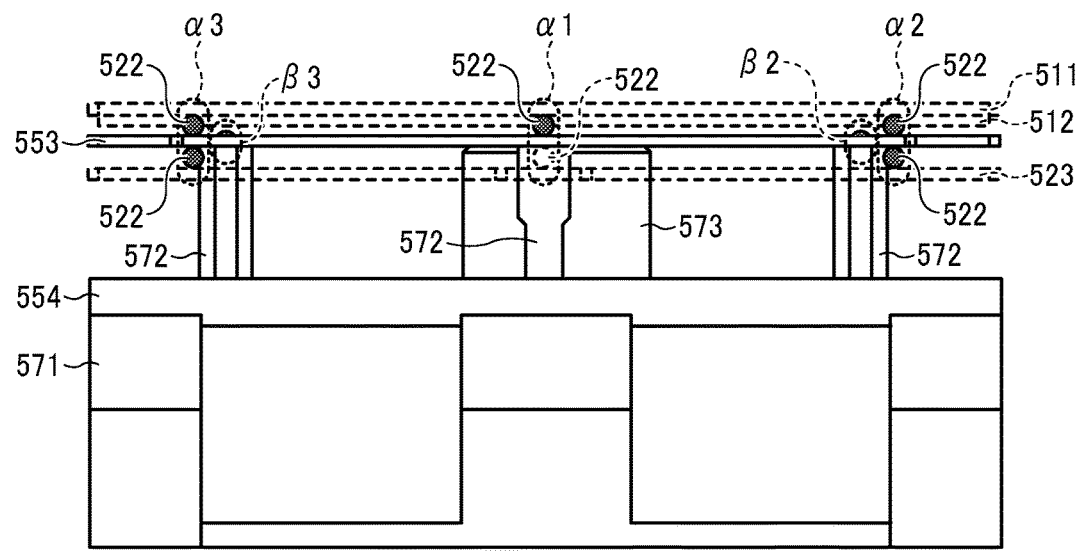
FIG. 13 is an illustration of the arrangement relationship between the supporting portions of the movable plate and the connecting portions of the movable plate connected to the heat sink.
Figure 13:
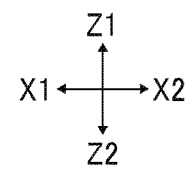

FIGS. 12 and 13 are illustrations of the arrangement relationship between the support portions of the movable plate 553 supported by the top plate 511 and the base plate 513 and the connection portions of the movable plate 553 connected to the heat sink 554. As illustrated in FIGS. 12 and 13, in the present embodiment, the movable plate 553 includes three support portions $\alpha$-1 to $\alpha$-3 supported between the top plate 511 and the base plate 513 via the pairs of support balls 522. The movable plate 553 also includes three connection portions $\beta$-1 to $\beta$-3 connected to the heat sink 554. Each of the support portions $\alpha$-1 to $\alpha$-3 forms a pair with one of the connection portions $\beta$-1 to $\beta$-3 and is configured not to share a pair with any other connecting portion. Each of the support portions is disposed at a position close to one connection portion.

For example, the support portion $\alpha$-1 is located at a position where the distance between the support portion $\alpha$-1 and the connection portion $\beta$-1 is shorter than the distance between the support portion $\alpha$-1 and each of the connection portion $\beta$-2 and the connection portion $\beta$-3. Similarly, the support portion $\alpha$-2 is disposed at a position where the distance between the support portion α-2 and the connection portion β-2 is shorter than the distance between the support portion α-2 and each of the connection portion β-1 and the connection portion β-3. The support portion α-3 is disposed at a position where the distance between the support portion α-3 and the connection portion β-3 is shorter than the distance between the support portion α-3 and each of the connection portion β-1 and the connection portion β-2. In this manner, the support portions α-1 to α-3 are disposed in one-to-one correspondence with the connection portions β-1 to β-3.

Since the connection portions β-1 to β-3 are fixed positions at which the movable plate 553 is fixed to the heat sink 554, the load of the heat sink 554 greatly acts on the connection portions β-1 to β-3. In the present embodiment, the three support portions α-1 to α-3 are disposed on the three connection portion β-1 to β-3, respectively, of the movable plate 553 with the above-described configuration, That is, in the movable plate 553, three connection positions connected to the connection posts 572 are disposed so as to correspond on a one-to-one basis to contact positions at which the movable plate 553 is supported by the pairs of support balls 522. Thus, each of the positions where the movable plate 553 is supported by the pairs of support halls 522 is arranged so as to correspond to the position on which the load of the heat sink 554 most acts. Accordingly, even if the heat sink 554 is fastened to the movable plate 553, such a configuration can reduce the deflection of the movable plate 553 due to the load of the heat sink 554. Thus, a reduction in mobile performance of the movable unit 55 can be suppressed, thus enhancing the stability of the shift operation of the projection image.

As the one-to-one correspondence of the support portions α-1 to α-3 and the connection portions β-1 to β-3, for example, the support portions α-1 to α-3 of the movable plate 553 are preferably disposed in one-to-one correspondence to the connection portions β-1 to β-3 of the movable plate 553, respectively, in the vicinity of the connection portions β-1 to β-3. The vicinity of the connection portion means a distance close to the connection portion, but is not necessarily limited to the configuration in which the support portions α-1 to α-3 are disposed within a certain distance from the connection portions β-1 to β-3. The support portions α-1 to α-3 may be disposed in one-to-one correspondence with the connection portions β-1 to β-3, respectively, in any other configuration as long as the support balls 522 does not contact the holding members 524 and so on, taking into consideration, e.g., the movable range of the movable plate 553 and the size of the screw 561 inserted into the connection hole 560 of the movable plate 553.

Here, a further description is given of the configuration in which the support portions α-1 to α-3 of the movable plate 553 are disposed in one-to-one correspondence to the connection portions β-1 to β-3 of the movable plate 553.

Since the movable plate 553 relatively moves relative to the top plate 511 and the base plate 513, the sliding friction between the top plate 511 and the base plate 513 is preferably reduced during movement of the movable plate 553. It is preferable to keep the flatness of the movable plate 553. Hence, in the present embodiment, the movable plate 553 is supported at three positions between the intermediate plate 512 and the base plate 513 by the three pairs of support balls 522 from above and below the movable plate 553.

Only the three pairs of support balls 522 support the movable plate 553 in contact with the movable plate 553. The plane produced by the three pairs of support balls 522 is a movable plane on which the movable plate 553 moves.

Since the contact positions of the movable plate 553 with the three pairs of support balls 522 are support points at which the movable plate 553 supports the weight of the movable unit 55, the load of the movable unit 55 concentrates on the three support points. Accordingly, when the load acts on the movable plate 553, the contact positions of the movable plate 553 with the three pairs of support balls 522 becomes the support points of the movable plate 553, and a moment for deflecting the movable plate 553 acts on the positions on which the load acts.

The moment for deflecting the movable plate 553 increases in proportion to the length between the support portion of the movable plate 553 and the connection portion of the movable plate 553 at which the movable plate 553 is connected to the heat sink 554. Therefore, as the connection portion is away from the support portion, the moment for deflecting the movable plate 553 is likely to increase and the movable plate 553 is more likely to bend. Since the heat sink 554 occupies most of the weight of the movable unit 55 as the load for deflecting the movable plate 553, it can be said that the influence of the weight of the heat sink 554 is significant.

As the load for deflecting the movable plate 553, for example, when the projector 1 (see FIGS. 1 to 5) including the image generation unit 50 is set to a setting position, an impact may be applied to the movable plate 553. When the projector 1 is set in such a way, a force from the heat sink 554 may act on the movable plate 553 via the connection posts 572 by the impact and a large force may concentrate on the fastening points of the movable plate 553 with the heat sink 554, thus deflecting the movable plate 553. If the movable plate 553 is deflected, the flatness of the movable plate 553 might not be secured and the driving performance of the movable plate 553 might be degraded.

In the present embodiment, the number of the connection posts 572 is three, which is the same as the number of the pairs of support balls 522 to be installed. That is, to connect the movable plate 553 and the heat sink 554 while securing the flatness of the movable plate 553, the number of the connection portions of the movable plate 553 with the heat sink 554 is set to three, which is a minimum number to form a plane, similarly with the number of the pairs of support balls 522. One of the support portions α-1 to α-3 is located at a position of a short distance (close distance) to one of the connection portions β-1 to β-3 on a one-to-one correspondence basis. That is, three positions at the movable plate 553 is connected to the connection posts 572 of the heat sink 554 are located in one-to-one correspondence to three positions at which the movable plate 553 contacts the pairs of support balls 522.

This means that the three support portions α-1 to α-3 at which the load of the movable unit 55 concentrates correspond to the three connection portions β-1 to β-3 on which the load is applied to the movable plate 553 by the movable unit 55 on a one-to-one basis.

By disposing the three support portions α-1 to α-3 and the three connecting points β-1 to β-3 in the movable plate 553 with the above-described configuration, the connecting points β-1 to β-3, the load acting on the connection portions β-1 to β-3 can supported by the support portions α-1 to α-3 disposed in the vicinity, even if a great load acts on the connection portions β-1 to β-3. Accordingly, even if the load of the movable unit 55 acts on the movable plate 553, the deflection of the movable plate 553 can be reduced, thus allowing the movable plate 553 to be stably moved in the planar direction. As a result, a reduction in mobile performance of the movable unit 55 can be suppressed, thus allowing the stability of the shift operation of the projection image to be enhanced.

The three support portions α-1 to α-3 are preferably disposed in the vicinity of the three connection portions β-1 to β-3 in one-to-one correspondence to the three connection portions β-1 to β-3. With such a configuration, the load applied to the movable plate 553 at three points acts on in the vicinities of the three support portions, respectively, of the movable plate 553. Accordingly, the load acting on the three connection portions β-1 to β-3 can be more stably supported at the three support portions α-1 to α-3, thus reducing the occurrence of the deflection of the movable plate 553. As a result, the stability of the movement of the movable plate 553 in the planar direction can be further enhanced, thus suppressing a reduction in mobile performance of the movable unit 55. Accordingly, the stability of the shift operation of the projection image can be further enhanced.

In the present embodiment, each of the number of the pairs of support balls 522 and the number of the connection posts 572 is three in terms of securing the stable planarity of the movable plate 553. However, the number is not limited to three in the present embodiment. As long as the planarity and mobility of the movable plate 553 can be secured, the number of the pairs of support balls 522 to be installed and the number of the connection posts 572 may be any other number so as to be at least in one-to-one correspondence to each other.

The number of the through holes 521 of the intermediate plate 512 and the number of the holding members 524 of the base plate 513 are set to three to stably move the movable plate 553 in the planar direction. However, the number is not limited to three in the present embodiment. Each of the number of the through holes 521 and the number of the holding members 524 may be three or more as long as the movable plate 553 can be stably moved in the planar direction.

When the number of the through holes 521 and the number of the holding members 524 is four or more, the support balls 522 need not be disposed in all of the through holes 521 and the holding members 524. Even in such a case, as long as each support portion is disposed in the vicinity of the corresponding connection portion, the support balls 522 may be disposed in the three or more pairs of the through holes 521 and the holding members 524 so that the movable plate 553 can be stably moved in the plane direction of the movable plate 553.

When the movable plate 553 moves parallel to the surface, the DMD substrate 552 connected to the movable plate 553, the heat sink 554, and the DMD 551 disposed on the DMD substrate 552 also move together with the movable plate 553. Accordingly, when the surface of the movable plate 553 is not parallel to the image generation surface of the DMD 551, the image generation surface of the DMD 551 might be inclined with respect to the movement direction, thus causing a distorted image. In the present embodiment, the interval between the movable plate 553 and the DMD substrate 552 is adjusted and the surface of the movable plate 553 and the image generation surface of the DMD 551 are kept parallel to each other. Such a configuration can suppress deterioration in image quality.

Other configurations of the movable unit 55 are described with reference to FIGS. 6 to 8.

As illustrated in FIGS. 6 to 8, the movable plate 553 has a movable-range restriction hole 562a and a movable-range restriction groove 562b at positions corresponding to the supports 518 of the stationary unit 51. The movable plate 553 might be greatly displaced due to, for example, vibration or some abnormality in a state in which the supports 518 of the stationary unit 51 are disposed in the movable-range restriction hole 562a and the movable-range restriction groove 562b. In such a case, the movable range of the movable plate 553 is restricted by the movable plate 553 contacting the supports 518.

Note that, for example, the number, position, and shape of each of the movable-range restriction hole 562a and the movable-range restriction groove 562b are not limited to the configurations exemplified in the present embodiment. For example, the number of each of the movable-range restriction hole 562a and the movable-range restriction groove 562b may be one or plural. Further, the shape of each of the movable-range restriction hole 562a and the movable-range restriction groove 562b may be different from the shape of the present embodiment and may be, for example, rectangle or circular. In addition, the movable plate 553 and the DMD substrate 552 may be connected to each other with a configuration different from the configuration of the present embodiment.

The position detecting magnets 531 are disposed at plural positions on the upper surface (surface on the top plate 511 side) of the movable plate 553. Each of the position detecting magnets 531 is made of a rectangular parallelepiped permanent magnet and forms a magnetic field extending to the DMD substrate 552 disposed between the top plate 511 and the base plate 513.

As illustrated in FIGS. 6 to 8, the heat sink 554 includes heat radiating portions 571, the connection posts 572, and the heat transfer portion 573.

The heat radiating portion 571 has a plurality of fins in a lower portion thereof, and dissipates the heat generated in the DMD 551. The recesses 574, on which the driving coils 533a, 533b, 533c, and 533d are mounted, are formed on upper surfaces of the heat radiating portions 571 (see FIG. 14).

The recesses 574 are formed at positions facing the driving magnets 532 disposed on the lower surface of the base plate 513. The driving coils 533 face the driving magnets 532 disposed on the lower surface of the base plate 513.

The connection posts 572 are disposed at three positions on the periphery of the upper surface of the heat sink 554 so as to extend in the Z1 direction from the upper surfaces of the heat radiating portions 571. The movable plate 553 is coupled and fixed to the upper ends of the connection posts 572 by screws 561 inserted into the connection holes 560 of the movable plate 553. The connection posts 572 are connected to the movable plate 553 by the cutouts of the MID substrate 552 without contacting the DMD substrate 552.

The heat transfer portion 573 is at a position opposed to the DMD 551 and is a columnar member extending from the upper surface of the heat radiating portion 571 in the Z1 direction. The heat transfer portion 573 of the heat sink 554 is inserted into the central grooves 513a, 514a, and 515a of the base plate 513, the control board 514, and the sub plate 515, and contacts the bottom surface of the DMD 551. The heat transfer portion 573 of the heat sink 554 contacts the bottom surface of the DMD 551 to transfer the heat generated in the DMD 551 to the heat radiating portion 571 and radiate heat, thus cooling the DMD 551. Suppressing the temperature rise of the DMD 551 by the heat sink 554 can reduce occurrence of troubles, such as malfunctions or failures due to the temperature rise of the DMD 551.

To enhance the cooling effect of the DMD 551, for example, an elastically deformable heat transfer sheet may be disposed between the upper surface of the heat transfer portion 573 and the DMD 551, for example, between the heat transfer portion 573 of the heat sink 554 and the DMD 551. The heat transfer sheet improves the thermal conductivity between the heat transfer portion 573 of the heat sink 554 and the DMD 551 and improves the cooling effect of the DMD 551.

Further, in the present embodiment, it can be said that four pillars stand on the heat sink 554. One pillar is the heat transfer portion 573. The heat transfer portion 573 is located at the center of the heat sink 554, is a pillar to contact the DMD 551, and has a function of transferring the heat of the DMD 551 to the fins. The remaining three pillars are connection posts 572.

The heat sink 554 is disposed to move together with the movable plate 553 and the DMD substrate 552. Since the heat transfer portion 573 is constantly in contact with the DMD 551, the heat sink 554 can constantly radiate the heat generated in the DMD 551 and efficiently cool the DMD 551.

The driving FPC 575 is disposed on the upper surface (the surface on the top plate 511 side) of the heat sink 554. The driving FPC 575 is are electrically connected to the driving coils 533.

In the present embodiment, in the image generation unit 50, the driving force for moving the movable unit 55 is generated by the top plate 511, the base plate 513, the sub plate 515, the movable plate 553, and the driving FPC 575.

Through holes 576 of the top plate 511, the through holes 559 of the movable plate 553, and the through holes 529 of the base plate 513 are formed so as to face each other in the Z1-Z2 direction. The screws to fix the top plate 511 to the illumination optical unit 40 are inserted into the through holes 576 of the top plate 511, the through holes 559 of the movable plate 553, and the through holes 529 of the base plate 513.

A space corresponding to the thickness of the socket 556 and the DMD 551 is generated between the surface of the DMD substrate 552 and the image generation surface of the DMD 551. Accordingly, for example, if the DMD substrate 552 is disposed above the top plate 511, the space from the surface of the DMD substrate 552 to the image generation surface of the DMD 551 would be a dead space, and the device configuration might become large.

In the present embodiment, the DMD substrate 552 is disposed between the top plate 511 and the base plate 513, and the top plate 511 is disposed in the space from the surface of the DMD substrate 552 to the image generation surface of the DMD 551. Accordingly, since the space from the surface of the DMD substrate 552 to the image generation surface of the DMD 551 can be effectively utilized, the height of the image generation unit 50 in the Z1-Z2 direction can be reduced and the image generation unit 50 can be downsized. Therefore, the image generation unit 50 can be assembled not only to a large-sized projector but also to a small-sized projector, thus enhancing versatility.

At least one or more of the top plate 511, the DMD substrate 552, the movable plate 553, and the holding member 524 is preferably formed of a conductive material such as stainless steel, aluminum, magnesium alloy, or the like. Thus, for example, electrical noise generated in the DMD 551 and the DMD substrate 552 is released to, for example, the housing of the illumination optical unit 40 through the top plate 511 and the DMD substrate 552. Such a configuration can reduce noise leakage to the outside.

Driver

In the present embodiment, the image generation unit 50 constitutes a driver to move the movable plate 553 by the driving magnets 532, the driving coils 533, and the driving FPC 575. The driving magnets 532 and the driving coils 533 are disposed so as to be opposed to each other between the sub plate 515 and the heat sink 554.

Figure 14:
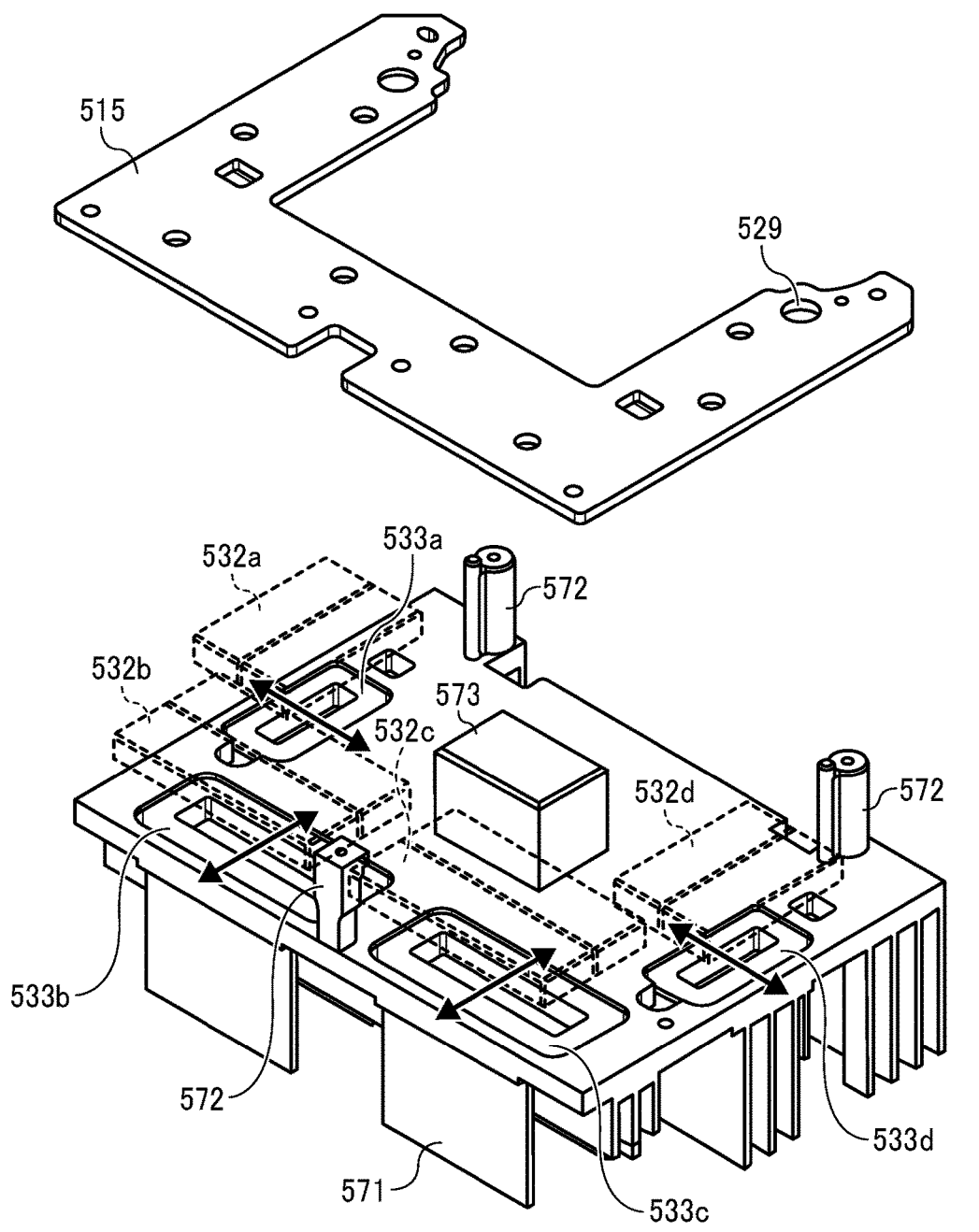
FIG. 14 is an illustration of an arrangement relationship between driving magnets and driving coils.

As illustrated in FIG. 14, the driving magnets 532 are disposed at four points along the shape of the sub plate 515 on the lower surface (the surface on the heat sink 554 side) of the sub plate 515. The driving magnets 532 are two pairs of two rectangular parallelepiped magnets arranged so that the longitudinal directions of the two rectangular parallelepiped magnets are parallel to each other. Each of the driving magnets 532 forms a magnetic field extending to the heat sink 554.

In the present embodiment, as illustrated in FIG. 14, the driving magnets 532b and 532c are two permanent magnets whose longitudinal direction is parallel to the X1-X2 direction. In addition, the driving magnets 532a and 532d are two permanent magnets whose longitudinal direction is parallel to the Y1-Y2 direction. Each of the driving magnets 532 forms a magnetic field extending to the heat sink 554.

The driving coils 533 are disposed on the heat sink 554. Each of the driving coils 533 is formed by winding an electric wire around an axis parallel to the Z1-Z2 direction and is mounted to the recess 574 formed on the upper surface of the heat radiating portion 571 of the heat sink 554.

The driving magnets 532 of the sub plate 515 and the driving coils 533 of the heat sink 554 are arranged so as to face each other in a state in which the movable unit 55 is supported by the stationary unit 51. When a current is supplied to the driving coil 533, a Lorentz force serving as a driving force to move the movable unit 55 is generated in the driving coil 533 by the magnetic fields formed by the driving magnets 532.

When the Lorentz force is transmitted to the heat sink 554, the movable plate 553 also displaces according to the displacement of the heat sink 554 since the heat sink 554 is connected to the movable plate 553. Accordingly, the movable unit 55 receives the Lorentz force generated between the driving magnets 532 and the driving coils 533 and is displaced linearly or rotationally in the X-Y plane with respect to the stationary unit 51.

In the present embodiment, the driving coil 533a and the driving magnet 532a, the driving coil 533d and the driving magnet 532d are disposed so as to be opposed to each other in the X1-X2 direction. When a current is passed through the driving coil 533a and the driving coil 533d, a Lorentz three in the Y1 direction or the Y2 direction is generated. The movable plate 553 moves in the Y1 direction or the Y2 direction by the Lorentz force generated in the driving coil 533a and the driving magnet 532a and the Lorentz force generated in the driving coil 533d and the driving magnet 532d.

In addition, in the present embodiment, the driving coil 533b and the driving magnet 532b are arranged side by side in the Y1-Y2 direction, and the driving coil 533c and the driving magnet 532c are arranged side by side in the Y1-Y2 direction. The driving magnet 532b and the driving magnet 532c are arranged such that the longitudinal directions of the driving magnet 532b and the driving magnet 532c are perpendicular to the longitudinal directions of the driving magnet 532a and the driving magnet 532d, respectively. In such a configuration, when current is passed through the driving coil 533b and the driving coil 533c, a Lorentz force in the X1 direction or X2 direction is generated as illustrated in FIG. 14.

The movable plate 553 moves in the X1 direction or the X2 direction due to the Lorentz force generated in the driving coil 533b and the driving magnet 532b and the Lorentz force generated in driving coil 533c and the driving magnet 532c. The movable plate 553 is displaced so as to rotate in the XY plane by the Lorentz forces generated in the opposite directions between the pair of the driving coil 533b and the driving magnet 532b and the pair of the driving coil 533c and the driving magnet 532c.

For example, a Lorentz force in the X1 direction is generated in the driving coil 533b and the driving magnet 532b, and a current flows so that a Lorentz force in the X2 direction is generated in the driving coil 533c and the driving magnet 532c. In this case, the movable plate 553 is displaced so as to rotate clockwise when viewed from above. A Lorentz force in the X2 direction is generated in the driving coil 533b and the driving magnet 532b, and a current flows so that a Lorentz force in the X1 direction is generated in the driving coil 533c and the driving magnet 532c. In this case, the movable plate 553 is displaced so as to rotate counter-clockwise when viewed from above.

In this manner, the image generation unit 50 can relatively move the movable unit 55 with respect to the stationary unit 51, and can freely shift the MAD 551 in the X direction and the Y direction and move in the rotation direction. Accordingly, for example, the image generation unit 50 can move the DMD 551 in the oblique 45 degree direction by a half pixel pitch of a certain frequency and output an image matching the direction, thereby achieving high resolution. Further, since the DMD 551 can be freely shifted in the X direction and in the Y direction and moved in the rotation direction, the projection image can be easily shifted in the horizontal direction and the vertical direction and easily adjusted in the rotation direction.

The magnitude and direction of the current flowing through each driving coil 533 are controlled by the drive controller 12 of the system control unit 10. The drive controller 12 controls, for example, the movement (rotation) direction, the movement amount, and the rotation angle of the movable plate 553 according to the magnitude and direction of the current flowing to each driving coil 533.

The driving FPC 575 is disposed on the upper surface (the surface on the top plate 511 side) of the heat sink 554. The driving FPC 575 is, for example, a wiring board including a metal layer made of, e.g., copper having high thermal conductivity. The driving FPC 575 is electrically connected to the driving coils 533 by wires.

Since the driving FPC 575 is connected to the control board 514 via a connector, one end of the driving FPC 575 is moved in parallel in the plane or rotated by the movable unit 55 and the other end is secured to the stationary unit 51. Accordingly, the driving FPC 575 need to have a function of absorbing the movement amount of the stationary unit 51 without hampering the movement of the stationary unit 51. Therefore, a plurality of creases are formed in the driving FPC 575 so as to absorb the movement amount of the stationary unit 51 even when one side of the driving FPC 575 moves with the other end of the driving FPC 575 fixed.

Note that the configuration of the above-described driver is not limited to the configuration exemplified in the present embodiment. The number and positions of the driving magnets 532 and the driving coils 533 as the driver may be different from the number and position of the present embodiment as long as the movable unit 55 can be moved to any given position. For example, the position detection magnets 531 may be disposed on the top plate 511 and the Hall elements 558 may be disposed on the movable plate 553.

Detector

In the present embodiment, the image generation unit 50 constitutes a detector to detect the position of the DMD 551 by the position detecting magnets 531, the Hall elements 558, and the position detecting FPC 564.

The position detecting magnets 531 are disposed on the upper surface (the surface on the top plate 511 side) of the movable plate 553. Each of the position detecting magnets 531 is made of a rectangular parallelepiped permanent magnet and forms a magnetic field extending to the DMD substrate 552 disposed between the top plate 511 and the base plate 513.

The Hall elements 558 are disposed on the upper surface (the surface on the top plate 511 side) of the DMD substrate 552 at positions facing the position detecting magnets 531 (see FIG. 8).

The Hall element 558 is an example of magnetic sensor and transmits a signal according to a change in magnetic flux density from the corresponding position detection magnet 531 to the drive controller 12 of the system control unit 10. The drive controller 12 detects the position of the DMD 551 based on signals transmitted from the Hall elements 558.

Similarly with the driving FPC 575, the position detecting FPC 564 is connected to the control board 514 via a connector. One end of the position detecting FPC 564 is moved in parallel in the plane or rotated by the movable unit 55 and the other end is secured to the stationary unit 51. Accordingly, the position detecting FPC 564 need to have a function of absorbing the movement amount of the stationary unit 51 without hampering the movement of the stationary unit 51. Therefore, a plurality of creases are formed in the position detecting FPC 564 so as to absorb the movement amount of the stationary unit 51 even when one side of the position detecting FPC 564 moves with the other end of the position detecting FPC 564 fixed.

In the present embodiment, the top plate 511 and the base plate 513 formed of a magnetic material function as a yoke plate and constitute a magnetic circuit including the position detection magnets 531. A magnetic flux generated in the driver including the driving magnets 532 and the driving coils 533 disposed between the sub plate 515 and the heat sink 554 concentrates on the base plate 513 functioning as the yoke plate, thus suppressing leakage of the magnetic flux to the detector.

Accordingly, the magnetic flux generated in the driver concentrates on the sub plate 515 and the heat sink 554, thus suppressing leakage of the magnetic flux to the outside from between the top plate 511 and the base plate 513.

Thus, in the Hall elements 558 disposed on the DMD substrate 552, the influence of magnetic fields formed in the driver including the driving magnets 532 and the driving coils 533 is reduced. Therefore, the Hall element 558 can output a signal corresponding to a change in magnetic flux density of the corresponding position detecting magnet 531 without being affected by the magnetic fields generated in the driver. Thus, the drive controller 12 can grasp the position of the DMD 551 with high accuracy.

The drive controller 12 (see FIG. 2) can accurately detect the position of the DMD 551 based on the outputs of the Hall elements 558 whose influence from the driver is reduced. Accordingly, the drive controller 12 can control the magnitude and direction of the current flowing through each of the driving coils 533 according to the detected position of the DMD 551, thus allowing the position of the DMD 551 to be controlled with high accuracy.

Note that the configuration of the above-described position detector is not limited to the configuration exemplified in the present embodiment. The number and positions of the position detection magnets 531 and the Hall elements 558 as the position detector may be different from the number and positions of the present embodiment as long as the position of the DMD 551 can be detected.

For example, the position detecting magnets 531 may be disposed on the upper surface of any one of the top plate 511, the intermediate plate 512, the control board 514, and the movable plate 553. The Hall elements 558 may be disposed on the lower surface of any one of the above-described plates. Alternatively, the position detecting magnets 531 may be disposed on the top plate 511, the intermediate plate 512, the control board 514, or the DMD substrate 552, and the Hall elements 558 may be disposed on the upper surface of the sub plate 515.

Further, the sub plate 515 may be partially formed of a magnetic material as long as the leakage of the magnetic flux from the driver to the position detector can be reduced. For example, the sub plate 515 may be formed by stacking a plurality of members including a flat-plate-shaped member or a sheet-shaped member formed of a magnetic material. If at least a part of the sub plate 515 is made of a magnetic material so as to function as a yoke plate and leakage of magnetic flux from the driver to the position detector can be prevented, the base plate 513 may be formed of a nonmagnetic material.

The top plate 511, the intermediate plate 512, the base plate 513, the DMD substrate 552, or the movable plate 553 is preferably made of a conductive material, such as stainless steel, aluminum, or magnesium alloy. Thus, for example, electric noise generated in the DMD 551, the DMD substrate 552, or the movable plate 553 is released to, e.g., the housing of the illumination optical unit 40 through the top plate 511 and the DMD substrate 552. Such a configuration can reduce noise leakage to the outside.

In the present embodiment, the image generation unit 50 constitutes a position detector and a driving force generator by a combination of any tow or more of components of the stationary unit 51 and the movable unit 55 constituting the image generation unit 50.

Position Detector In the present embodiment, the position detector includes the DMD 551, the DMD substrate 552, the position detecting FPC 564, the Hall elements 558, the position detecting magnets 531, the top plate 511, the intermediate plate 512, the base plate 513, and the movable plate 553.

Driving Force Generator The driving force generator includes the control board 514, the sub plate 515, the driving magnets 532, the driving coils 533, the heat sink 554, and the driving FPC 575.

Image Projection

As described above, in the projector 1 according to the present embodiment, the DMD 551 to generate a projection image is disposed in the movable unit 55, and the position of the DMD 551 is controlled by the drive controller 12 of the system control unit 10.

The drive controller 12 controls the position of the movable unit 55 so as to move at high speed between a plurality of positions separated by a distance less than the arrangement interval of the plurality of micromirrors of the DMD 551, for example, at a predetermined cycle corresponding to a frame rate during projection of an image. At this time, the image controller 11 transmits the image signal to the DMD 551 so as to generate the projection image having been shifted according to each position.

For example, the drive controller 12 reciprocates the DMD 551 at the predetermined cycle between the positions separated by the distance less than the arrangement interval of the micromirrors of the DMD 551 in the X1-X2 direction and the Y1-Y2 direction. At this time, the image controller 11 controls the DMD 551 so as to generate projection images shifted according to the respective positions, thus allowing the resolution of the projection images to be made approximately twice as high as the resolution of the DMD 551. Further, by increasing the moving position of the DMD 551, the resolution of the projection image can be made twice or more than the resolution of the DMD 551.

Accordingly, the drive controller 12 shifts the DMD 551 together with the movable unit 55, and the image controller 11 generates a projection image corresponding to the position of the DMD 551, thus allowing projection of an image whose resolution has been made equal to or higher than the resolution of the DMD 551.

In the projector 1 according to the present embodiment, the drive controller 12 controls the DMD 551 to rotate together with the movable unit 55, thus allowing the projection image to be rotated without being reduced. For example, in a projector in which an image generator, such as the DMD 551, is fixed, a projection image cannot be rotated while maintaining the aspect ratio of the projection image, unless the projection image is reduced. By contrast, in the projector 1 according to the present embodiment, since the DMD 551 can be rotated, the inclination or the like can be adjusted by rotating the projection image without reducing the projection image.

As described above, in the projector 1 according to the present embodiment, each of the support portions α-1 to α-3 of the movable plate 553 form a pair with a corresponding one of the connection portions β-1 to β-3. When the support portion and the connection portion closest to the support portion are regarded as a pair, each of the connection portions β-1 to β-3 forms a pair with only one of the support portions α-1 to α-3 and does not share the pair with another connection portion. Accordingly, even if a large load acts on the movable plate 553, the deflection of the movable plate 553 can be prevented, thus allowing the movable plate 553 to be stably moved in the planar direction. Thus, a reduction in mobile performance of the movable unit 55 can be suppressed, thus enhancing the stability of the shift operation of the projection image.

Note that the configuration in which the movable plate 553 is supported by the pair of support balls 522 has been described in this embodiment, but embodiments of the present disclosure are not limited to the configuration of the present embodiment. For example, the DMD substrate 552 may be supported by the pair of support balls 522.

Further, in the present embodiment, the case where the pair of support balls 522 are arranged in the through hole 521 and the holding member 524 has been described. However, the configuration of the pair of support balls 522 is not limited to the configuration of the present embodiment. Instead of the through hole 521 and the holding member 524, for example, a pair of convex portions may be disposed facing the top plate 511 and the movable plate 553, respectively.

As described above, the projector 1 according to the present embodiment can enhance the resolution of a projection image by shifting the DMD 551 while stably maintaining the mobile performance of the movable unit 55. Accordingly, the projector 1 according to the present embodiment can provide a projection image with enhanced durability and reliability.

Although the image generation device and the image projection apparatus according to some embodiments have been described above, embodiments of the present invention are not limited to the above-described embodiments, and various modifications and improvements are possible within the scope of the present invention.

Numerous additional modifications and variations are possible in light of the above teachings. It is therefore to be understood that, within the scope of the above teachings, the present disclosure may be practiced otherwise than as specifically described herein. With some embodiments having thus been described, it will be obvious that the same may be varied in many ways. Such variations are not to be regarded as a departure from the scope of the present disclosure and appended claims, and all such modifications are intended to be included within the scope of the present disclosure and appended claims.

What is claimed is:

1. An image generation device, comprising:
   an image generator to receive light and to generate an image;
   a stationary unit including a stationary plate; and
   a movable unit including:
      a movable plate, movably supported at a plurality of movable support portions by the stationary plate, the image generator being mounted on the movable plate, and
      a diffusion heat radiator, connected to the movable plate at a plurality of connection portions of the movable plate,
   wherein, one of the plurality of movable support portions forms a pair with one of the plurality of connection portions relatively closest to the one of the plurality of movable support portions, proximate to the one of the plurality of movable support portions and having a relatively shortest distance to the one of the plurality of movable support portions compared to any of the other of the plurality of movable support portions, and wherein each of other of the plurality of connection portions forms a pair with a corresponding one of another of the plurality of movable support portions proximate thereto and that do not share the pair with any other connection portion of the plurality of connection portions, the diffusion heat radiator being fixedly connected to the movable plate at the plurality of connection portions.

2. The image generation device according to claim 1, wherein the plurality of movable support portions are disposed in one-to-one correspondence to the plurality of connection portions.

3. The image generation device according to claim 1, wherein the stationary unit include:
   a first stationary plate; and
   a second stationary plate opposed to the first stationary plate, and
   wherein the movable plate is movably supported between the first stationary plate and the second stationary plate.

4. The image generation device according to claim 3, wherein the movable plate includes a first movable plate and a second movable plate,
   wherein the second movable plate is connected to the first movable plate on a second stationary plate side of the first movable plate, the second stationary plate being disposed on the second stationary plate side of the first movable plate, and
   wherein the second movable plate is movably supported between the first stationary plate and the second stationary plate.

5. The image generation device according to claim 3, further comprising a holder to hold the movable plate between the first stationary plate and the second stationary plate.

6. The image generation device according to claim 1, further comprising:
   a driving magnet;
   a driving coil, opposed to the driving magnet between the movable plate and the stationary plate;
   a driver to relatively move the movable unit with respect to the stationary unit;
   a drive controller to control the driver; and
   an image controller to generate an image signal according to a position of the movable unit and to transmit the image signal to the image generator,
   wherein the image generator includes a digital micromirror device, including a plurality of micromirrors, to modulate, according to the image signal, light emitted from a light source, and
   wherein the drive controller is configured to control the driver to move the movable unit at a cycle by a distance less than an arrangement interval of the plurality of micromirrors.

7. An image projection apparatus comprising:
   a light source;
   the image generation device of claim 1 to receive light from the light source and to generate an image;
   an illumination optical unit to guide the light from the light source to the image generation device; and
   a projection optical unit to project the image generated by the image generation device.

8. The image generation device according to claim 1, wherein the plurality of movable support portions include support balls.

9. The image generation device according to claim 8, wherein each of the plurality of movable support portions includes a pair of support balls.

10. The image generation device according to claim 9, wherein the movable plate is located between the support balls of each of the pairs of support balls, each of the pairs of support balls being configured to pinch the movable plate from both a top side and a bottom side of the movable plate.

11. The image generation device according to claim 1, wherein the plurality of connection portions are connected to the diffusion heat radiator via a plurality of connection posts, the diffusion heat radiator being fixedly connected to the movable plate, at the plurality of connection portions, via the plurality of connection posts.

12. The image generation device according to claim 9, wherein the plurality of connection portions are connected to the diffusion heat radiator via a plurality of connection posts, the diffusion heat radiator being fixedly connected to the movable plate, at the plurality of connection portions, via the plurality of connection posts.

13. The image generation device according to claim 10, wherein the plurality of connection portions are connected to the diffusion heat radiator via a plurality of connection posts, the diffusion heat radiator being fixedly connected to the movable plate, at the plurality of connection portions, via the plurality of connection posts.

14. The image generation device according to claim 2, wherein the plurality of movable support portions include support balls.

15. The image generation device according to claim 14, wherein each of the plurality of movable support portions includes a pair of support balls.

16. The image generation device according to claim 15, wherein the movable plate is located between the support balls of each of the pairs of support balls, each of the pairs of support balls being configured to pinch the movable plate from both a top side and a bottom side of the movable plate.

17. The image generation device according to claim 15, wherein the plurality of connection portions are connected to the diffusion heat radiator via a plurality of connection posts, the diffusion heat radiator being fixedly connected to the movable plate, at the plurality of connection portions, via the plurality of connection posts.

18. The image generation device according to claim 16, wherein the plurality of connection portions are connected to the diffusion heat radiator via a plurality of connection posts, the diffusion heat radiator being fixedly connected to the movable plate, at the plurality of connection portions, via the plurality of connection posts.

19. The image generation device according to claim 11, wherein a distance between each respective one of the plurality of movable support portions and a paired respective one of the plurality of connection portions is relatively shorter than a distance between each respective one of the plurality of movable support portions and other non-paired ones of the plurality of connection portions.

20. The image generation device according to claim 2, wherein a distance between each respective one of the plurality of movable support portions and a paired respective one of the plurality of connection portions is relatively shorter than a distance between each respective one of the plurality of movable support portions and other non-paired ones of the plurality of connection portions.

* * * * *